US012782374B2

(12) United States Patent
Xie et al.

(10) Patent No.: US 12,782,374 B2
(45) Date of Patent: Nov. 3, 2026

(54) BLOOD SAMPLE ANALYZER, BLOOD SAMPLE ANALYSIS METHOD AND COMPUTER STORAGE MEDIUM

(71) Applicants: SHENZHEN MINDRAY BIO-MEDICAL ELECTRONICS CO., LTD., Shenzhen (CN); SHENZHEN MINDRAY SCIENTIFIC CO., LTD., Shenzhen (CN)

(72) Inventors: Zixian Xie, Shenzhen (CN); Lijian Hu, Shenzhen (CN)

(73) Assignees: SHENZHEN MINDRAY BIO-MEDICAL ELECTRONICS CO., LTD., Shenzhen (CN); SHENZHEN MINDRAY SCIENTIFIC CO., LTD., Shenzhen (CN)

( * ) Notice: Subject to any disclaimer, the term of this patent is extended or adjusted under 35 U.S.C. 154(b) by 945 days.

(21) Appl. No.: 17/170,862

(22) Filed: Feb. 8, 2021

(65) Prior Publication Data

US 2021/0223276 A1 Jul. 22, 2021

Related U.S. Application Data

(63) Continuation of application No. PCT/CN2018/102313, filed on Aug. 24, 2018.

(51) Int. Cl.

| | |
|---|---|
| ***G01N 35/04*** | (2006.01) |
| ***B01F 11/00*** | (2006.01) |
| ***B01F 31/20*** | (2022.01) |
| ***G01N 35/00*** | (2006.01) |

(52) U.S. Cl.

CPC .......... *G01N 35/04* (2013.01); *B01F 31/201* (2022.01); *G01N 35/00584* (2013.01); *G01N 2035/00524* (2013.01); *G01N 2035/0401* (2013.01)

(58) Field of Classification Search

CPC ...... B01F 27/806; B01F 31/201; B01F 31/23; B01F 31/441; B01F 33/82;

(Continued)

(56) References Cited

U.S. PATENT DOCUMENTS

| | | | | |
|---|---|---|---|---|
| 2010/0332144 A1* | 12/2010 | Nagai | ................ G01N 35/0095 702/19 |
| 2011/0104007 A1* | 5/2011 | Hirano | ................ G01N 35/025 422/63 |

(Continued)

FOREIGN PATENT DOCUMENTS

| | | |
|---|---|---|
| CN | 1334453 A | 2/2002 |
| CN | 101324579 A | 12/2008 |

(Continued)

OTHER PUBLICATIONS

Zhang, W. et al., "Study of Blood Cell Counting Certified Reference Materials," China Powder Science and Technology, vol. 15 No. 6, Dec. 2009, 5 pages.

*Primary Examiner* — Matthew D Krcha
*Assistant Examiner* — Austin Q Le
(74) *Attorney, Agent, or Firm* — Syncoda LLC; Feng Ma

(57) ABSTRACT

Disclosed is a blood sample analyzer, including: a sample conveying device for conveying a sample rack loaded with a sample container; a first agitating device having a sample stirring component for stirring a blood sample in the sample container and being capable of driving the sample stirring component to uniformly agitate the blood sample in the sample container; a second agitating device capable of picking up the sample rack or a second sample container on (Continued)

the sample rack, and driving the second sample container containing a common-volume blood sample on a second agitating position to uniformly agitate the blood sample; and a controller configured to communicate with the sample conveying device, the first agitating device and the second agitating device, and control the sample conveying device, the first agitating device and the second agitating device. In addition, the present application further discloses a blood sample agitating device, a blood sample analysis method, and a computer storage medium.

13 Claims, 25 Drawing Sheets

(58) Field of Classification Search
CPC ............. G01N 35/00584; G01N 35/04; G01N 2035/00524; G01N 2035/00534; G01N 2035/0401; G01N 2035/041; G01N 2035/0412
See application file for complete search history.

(56) References Cited

U.S. PATENT DOCUMENTS

2012/0028343 A1* 2/2012 Kitagawa ......... G01N 35/00722 422/561
2013/0082099 A1* 4/2013 Furrer ................. B01L 3/50825 235/487
2017/0361289 A1* 12/2017 Hammerschmidt ......................... B01F 35/1453
2020/0232894 A1* 7/2020 Delubac ................ B01L 3/0293

FOREIGN PATENT DOCUMENTS

| | | | |
|---|---|---|---|
| CN | 101576562 | A | 11/2009 |
| CN | 101639419 | A | 2/2010 |
| CN | 101852797 | A | 10/2010 |
| CN | 102253230 | A | 11/2011 |
| CN | 103257102 | A | 8/2013 |
| CN | 103359346 | A | 10/2013 |
| CN | 103675309 | A | 3/2014 |
| CN | 103712902 | A | 4/2014 |
| CN | 104833813 | A | 8/2015 |
| CN | 204882559 | U | 12/2015 |
| CN | 106896049 | A | 6/2017 |
| CN | 107121559 | A | 9/2017 |
| DE | 202013100332 | U1 | 3/2013 |
| EP | 2610621 | A2 | 7/2013 |
| JP | 58190764 | A | 11/1983 |
| JP | 6427626 | A | 1/1989 |
| JP | 2008209383 | A | 9/2008 |
| WO | 2008095358 | A1 | 8/2008 |
| WO | 2016127301 | A1 | 8/2016 |
| WO | 2018032718 | A1 | 2/2018 |
| WO | 2018032720 | A1 | 2/2018 |

* cited by examiner (a)

(b)

| | 1st | 2nd | 3rd | 4th | 5th | 6th |
|---|---|---|---|---|---|---|
| HGB(hemoglobin concentration)g/L | 145 | 145 | 145 | 145 | 145 | 144 |
| RBC（red blood cell count） | 6.70 | 6.69 | 6.75 | 6.76 | 6.71 | 6.62 |
| WBC（white blood cell count） | 7.70 | 7.50 | 7.79 | 7.39 | 7.42 | 8.17 |
| PLT（platelet count） | 257 | 283 | 268 | 278 | 266 | 256 |
| MCV（mean corpuscular volume） | 67.4 | 67.5 | 67.4 | 67.9 | 67.2 | 68.3 |
| HCT（hematocrit） | 45.2 | 45.2 | 45.5 | 45.9 | 45.1 | 45.2 |

Fig.31

| Blood volume | HGB(Unit:g/L) | | | | | | |
|---|---|---|---|---|---|---|---|
| | 1st | 2nd | 3rd | 4th | 5th | 6th | Mean value |
| 30μL | 134 | 136 | 133 | 136 | 135 | 133 | 134.5 |
| 50μL | 147 | 148 | 145 | 148 | 147 | 145 | 146.7 |
| 100μL | 143 | 143 | 143 | 142 | 142 | 142 | 142.5 |
| 150μL | 126 | 126 | 127 | 127 | 125 | 127 | 126.3 |
| 200μL | 119 | 119 | 120 | 119 | 119 | 120 | 119.3 |
| 250μL | 135 | 135 | 135 | 135 | 135 | 136 | 135.2 |

Fig.32

BLOOD SAMPLE ANALYZER, BLOOD SAMPLE ANALYSIS METHOD AND COMPUTER STORAGE MEDIUM

CROSS-REFERENCE TO RELATED APPLICATIONS

This application is a continuation of PCT Application No. PCT/CN2018/102313, filed Aug. 24, 2018, and titled BLOOD SAMPLE ANALYZER, BLOOD SAMPLE ANALYSIS METHOD, AND COMPUTER STORAGE MEDIUM, which is incorporated herein by reference.

TECHNICAL FIELD

The present application relates to the field of sample analysis, and particularly to a blood sample analyzer for agitating and analyzing a collected small-volume sample and a blood sample agitating method.

BACKGROUND ART

In the process of clinical diagnosis, an analysis device is often used to measure a blood, urine, or body fluid (ascites, myelencephalon, hydrothorax, etc.) sample collected from a patient. The analysis device usually prescribes the required sample volume in advance. Taking the blood sample as an example, there are two blood collection methods at present: venous blood collection and peripheral blood collection. The venous blood collection method collects a large amount of blood (≥1 mL), and is usually suitable for adult patients. For infants, children or critically ill patients, it is sometimes difficult to collect blood through the venous blood collection method. In this case, peripheral blood is often collected. The collection of peripheral blood faces the situation that only a small amount of blood (≤100 μL in most cases) can be collected.

When collecting a blood, in order to prevent blood coagulation, a blood collection tube containing an anticoagulant is usually used. Blood is composed of blood cells and plasma. Due to different specific gravities of the blood cells and the blood plasma, the anti-coagulated blood will be stratified after standing for a period of time. Therefore, a blood sample is required to be agitated thoroughly before measurement, otherwise the measurement result will have large deviation.

CN1334453A discloses a device for treating samples of blood products, and the device has an agitation means for stirring a blood sample in a test tube. The agitation means clamps the test tube with a clamping assembly, and rotates the clamping assembly to continuously rotate the test tube through 360°, thereby continuously inverting the test tube up and down, and thus stirring the blood sample in the test tube.

For a common-volume blood sample (venous blood sample), due to the large amount of blood collection and the good fluidity of blood, when the blood collection tube is inverted, the venous blood inevitably flows along the tube wall under the action of gravity, so the method of multiple inversions disclosed in CN1334453A can be used, causing the blood to flow back and forth along the tube wall to achieve agitating.

In CN1334453A, the same stirring operation is used for common-volume and small-volume blood samples. However, the inverted agitating method disclosed in CN1334453A will cause part of the blood to remain on the cap and wall of the blood collection tube, thereby resulting in the loss of blood sample. For a common-volume sample such as a venous blood sample, the lost blood sample accounts for a small proportion of the total amount of collected blood, and does not affect measurement. However, for a small-volume sample such as a peripheral blood sample, since the amount of the collected peripheral blood sample is small and the fluidity is poor, the peripheral blood often adheres to the cap, bottom or wall of the blood collection tube and does not flow when the blood collection tube is inverted. The above-mentioned inverted agitating technology disclosed in the prior art causes the loss of blood sample and adversely affects measurement, and there are still difficulties in effectively solving the problem of agitating peripheral blood. Therefore, even if the inverted agitating method disclosed in CN1334453A can agitate common-volume blood samples thoroughly, it may agitate small-volume blood samples poorly.

Regarding the technical problem of poor agitating in the above-mentioned CN1334453A, CN103675309A discloses a sample treatment device comprising a stirring motor component and a hand component, and the hand component is driven to rotate by the stirring motor component, so that a sample container rotates between an inverted state and an upright state. In CN103675309A, in order to distinguish different requirements of agitating between a common-volume blood sample and a small-volume blood sample, the time for stirring the small-volume blood sample is longer than the time for agitating the common-volume blood sample, so that the small-volume blood sample can be agitated thoroughly.

Although in CN103675309A, the time for stirring the small-volume blood sample is longer than the time for stirring the common-volume blood sample, so that the small-volume blood sample can be agitated thoroughly. However, there are still situations where the small-volume blood sample always adheres to the cap or the upper wall part of the blood collection tube.

Therefore, using the above-mentioned inverted agitating technology disclosed in the prior art to agitate the peripheral blood faces two problems: (1) at present, most peripheral blood collection tubes in domestic are provided with plastic caps, which do not support puncture (if the plastic caps are directly punctured, the plastic caps would damage puncture needles, and plastic debris would fall into blood collection tubes and blood samples would be contaminated), so the caps of the blood collection tubes are required to open first before measurement, but the blood sample flows out if the blood collection tubes are inverted; and (2) even if blood collection tubes with rubber caps provided by some manufacturers abroad can be punctured, the imported blood collection tubes are relatively high-cost and cannot be popularized, and the more serious problem is that inverting blood collection tube will cause part of blood sample to remain on rubber cap resulting in loss, and because the amount of peripheral blood collected is small, the lost blood sample accounts for a large proportion of the total amount of blood collected, and analyzers are very possible to aspirate insufficient sample, thereby affecting measurement results.

CN107121559A discloses a method for uniformly agitating a mixed solution of a peripheral blood sample and a diluent. In this method, a sampling needle is inserted into a centrifuge tube of the mixed solution, and the mixed solution is agitated uniformly by automatic suction and discharge of the sampling needle.

For a whole blood sample, it is not a homogeneous liquid, but is composed of plasma (generally about 55% by volume) and blood cells (generally about 45% by volume). The blood cells can be understood as tiny particles, whose density is generally slightly larger than that of the plasma. Therefore, if the whole blood sample is added with an anticoagulant (to prevent blood coagulation) and stood for a period of time, the blood sample will be stratified in the blood collection tube 92: the plasma is in the upper layer, and the blood cells are in the lower layer (see FIG. 1). If the automatic suction and discharge method disclosed in CN107121559A is used to agitate the whole blood sample, the sampling needle is in the plasma layer or blood cell layer due to the stratification of the blood sample. The sampling needle often performs suction and discharge in one of the plasma layer or blood cell layer, so it is difficult to mix the plasma layer with the blood cell layer thoroughly. In addition, the amount of suction and discharge by the sampling needle each time is small, so a long time is required for agitating.

Based on the above-mentioned technical problems of the sample agitating technologies disclosed in the prior art and the urgent market demand for fully automated measurement of peripheral blood, the present invention proposes a sample analyzer and a sample agitating method, which can effectively stir a small-volume whole blood sample such as a peripheral blood sample uniformly.

SUMMARY OF THE INVENTION

According to a first aspect of the present application, a blood sample analyzer is provided, including: a sample conveying device for conveying a sample rack loaded with a first and/or second sample container; a first agitating device having a sample stirring component for stirring a blood sample in the first sample container, the first agitating device being capable of driving the sample stirring component to agitate a small-volume blood sample contained in the first sample on the sample rack on a first agitating position; a second agitating device capable of picking up the sample rack or the second sample container on the sample rack, and driving the second sample container containing a common-volume blood sample on a second agitating position to agitate the blood sample; and a controller configured to communicate with the sample conveying device, the first agitating device and the second agitating device, and control actions of the sample conveying device, the first agitating device and the second agitating device.

According to a second aspect of the present application, a blood sample analyzer is provided, including: a sample receiving assembly having a sample receiving cover and a sample container fixing hole, and configured for individually feeding a small-volume blood sample or a common-volume blood sample placed in the sample container fixing hole; and a agitating device having a sample stirring component for stirring a blood sample in a sample container, the agitating device being capable of driving the sample stirring component to agitate the blood sample in the sample container.

According to a second aspect of the present application, a blood sample analyzer is provided, including: a first agitating device capable of agitating a blood sample in a first sample container; a second agitating device capable of agitating a blood sample in a second sample container in a mode different from that of the first agitating device; and a controller configured to communicate with the first agitating device and the second agitating device, and capable of executing the following operations: (1) determining whether a current measurement mode is a first measurement mode or a second measurement mode; (2) when the current measurement mode is determined to be the first measurement mode, controlling the first agitating device to agitate the blood sample in the first sample container; and (3) when the current measurement mode is determined to be the second measurement mode, controlling the second agitating device to agitate the blood sample in the second sample container.

According to a third aspect of the present application, a blood sample analyzer is provided, including: a sample conveying device for conveying a sample rack loaded with a sample container; a agitating device having a sample stirring component for stirring a blood sample in the sample container, the agitating device being capable of driving the sample stirring component to agitate the blood sample in the sample container; and a controller configured to communicate with the sample conveying device and the agitating device, and control actions of the sample conveying device and the agitating device.

According to a fourth aspect of the present application, a blood sample analysis method for a blood routine is provided, including: conveying a sample container containing a blood sample to an agitating position; driving a sample stirring component of a first agitating device to agitate the blood sample in the sample container; aspirating a predetermined sampling amount of the blood sample from the sample container on the agitating position to prepare a test sample for blood routine test items; and testing the test sample to obtain relevant indicators of the blood routine test items.

According to a fifth aspect of the present application, a blood sample analysis method is provided, including: measurement mode determination step: determining whether a current measurement mode is a first measurement mode or a second measurement mode; first test sample preparation step: when the current measurement mode is determined to be the first measurement mode, controlling a first agitating device to drive a sample stirring component to agitate a blood sample in a sample container, and aspirating a first sampling amount of the blood sample to prepare a first test sample; second test sample preparation step: when the current measurement mode is determined to be the second measurement mode, controlling a second agitating device to agitate the blood sample in the sample container, and aspirating a second sampling amount of the blood sample to prepare a second test sample; and test step: testing the first test sample or the second test sample.

According to a sixth aspect of the present application, a blood sample analyzer is provided, including: a sample conveying device for conveying a sample rack loaded with a sample container; an agitating device having a sample aspirator for suctioning and discharging a blood sample in the sample container, the sample aspirator being capable of driving a sample aspirating needle of the sample aspirator to suction and discharge the blood sample in the sample container containing a small-volume blood sample on a sampling position; and a controller configured to communicate with the sample conveying device and the agitating device, and control actions of the sample conveying device and the agitating device.

According to a seventh aspect of the present application, a blood sample agitating method is provided, including: suctioning, by a sample aspirating needle, an appropriate amount of air to form an isolated air column inside the sample aspirating needle; driving the sample aspirating needle to move downward close to a bottom of a sample container; driving the sample aspirating needle to aspirate an appropriate amount of a blood sample, and then discharging the suctioned blood sample to the sample container, so that the blood sample in the sample container forms a certain flow until the blood sample is agitated uniformly.

According to an eighth aspect of the present application, a controller for a blood sample analyzer is provided, including: at least one processor; and a memory storing instructions executable by the at least one processor, wherein the instructions, when executed by the at least one processor, cause the blood sample analyzer to execute any of the methods described above.

According to an eighth aspect of the present application, provided is a computer storage medium storing computer executable instructions that, when executed by at least one processor of a blood sample analyzer, cause the blood sample analyzer to execute any of the methods described above.

Further, the sample conveying device is capable of conveying the sample rack loaded with the first and/or second sample container to the first agitating position; and the second agitating device is capable of picking up the sample rack or the second sample container on the sample rack from the first agitating position and conveying the sample rack or the second sample container on the sample rack to the second agitating position.

Further, the first agitating position and the second agitating position are the same position.

Further, the sample stirring component includes a cylindrical, paddle-shaped or polygonal head.

Further, the controller controls the sample stirring component to perform stirring in one or a combination of rotation, circular orbit, linear swing, and up-and-down vibration modes.

Further, the sample stirring component is capable of moving up and down, and is capable of moving downwards into the first sample container on the first agitating position for agitation.

Further, the blood sample analyzer further includes: a cleaning component for cleaning the sample stirring component; preferably, the cleaning component includes a cleaning fluid inlet and a cleaning fluid outlet, for cleaning the sample stirring component in the cleaning component; and more preferably, the cleaning fluid outlet is further configured for exhausting air to dry the sample stirring component.

Further, the cleaning component includes a cleaning tank capable of cleaning the sample stirring component.

Further, the blood sample analyzer further includes: a sample receiving assembly having a sample receiving cover and a sample container fixing hole, and configured for individually feeding a small-volume blood sample or a common-volume blood sample placed in the sample container fixing hole.

Further, the blood sample analyzer further includes: the controller is further configured to determine whether a current feeding mode is a first feeding mode or a second feeding mode; when the current feeding mode is determined to be the first feeding mode, control the sample conveying device to convey the sample rack loaded with the first and/or second sample container; and when the current feeding mode is determined to be the second feeding mode, control the sample receiving assembly to convey the first and/or second sample container individually.

Further, the sample conveying device is configured to convey the sample rack loaded with the first sample container to a predetermined position, and a clamping jaw of the second agitating device is capable of grabbing the first sample container from the sample rack at the predetermined position to the first agitating position.

Further, the blood sample analyzer further includes: a measurement mode setting device for setting a first measurement mode and a second measurement mode; wherein the controller executes the following operations according to the setting of the measurement mode setting device: (1) determining whether a current measurement mode is the first measurement mode or the second measurement mode; (2) when the first measurement mode is determined, controlling the first agitating device to agitate the blood sample in the first sample container; and (3) when the second measurement mode is determined, controlling the second agitating device to grab the second sample container for agitating.

Further, the blood sample analyzer further includes: a sample aspirator for aspirating the agitated blood sample from the sample container; when the first measurement mode is determined to be set, the controller controls the sample aspirator to aspirate a first sampling amount of the blood sample from the first sample container; when the second measurement mode is determined to be set, the controller controls the sample aspirator to aspirate a second sampling amount of the blood sample from the second sample container; wherein the first sampling amount is less than the second sampling amount; and preferably, the first sampling amount is 5-50 μL, and more preferably 15-35 μL.

Further, the measurement mode setting device is further configured to set a third measurement mode; and when the third measurement mode is determined to be set, the controller controls the first agitating device to agitate a pre-diluted blood sample in the first sample container.

Further, the first agitating device is configured to agitate a small-volume whole blood sample in the first sample container; and preferably, the small-volume whole blood sample in the first sample container has a volume of 30-250 μL, more preferably 50-200 μL, and still more preferably 50-100 μL.

Further, a fluctuation range of hemoglobin values of the small-volume blood sample measured repeatedly is not more than +2 g/L, after the small-volume blood sample in the first sample container has been agitated by the first agitating device.

Further, the blood sample analyzer is configured to only treat small-volume whole blood samples and pre-diluted blood samples.

Further, the blood sample analyzer further includes: a sample aspirator for aspirating the agitated blood sample from the sample container; a sample preparation device for preparing a test sample from the blood sample aspirated by the sample aspirator; and a controller configured to communicate with the agitating device, the sample aspirator and/or the sample preparation device, and control actions of the agitating device, the sample aspirator and/or the sample preparation device.

Further, the blood sample analyzer further includes: a measurement mode setting device for setting a first measurement mode and a second measurement mode; wherein the controller executes the following operations according to the setting of the measurement mode setting device: (1) determining whether a current measurement mode is the first measurement mode or the second measurement mode; (2) when the current measurement mode is determined to be the first measurement mode, controlling the sample aspirator to aspirate a first sampling amount of the blood sample from the sample container on the sample rack, and controlling the sample preparation device to prepare a first test sample; and (3) when the current measurement mode is determined to be the second measurement mode, controlling the sample aspirator to aspirate a second sampling amount of the blood sample from the sample container on the sample rack, and controlling the sample preparation device to prepare a second test sample; wherein the first sampling amount is less than the second sampling amount; and preferably, the first sampling amount is 5-50 μL, and more preferably 15-35 μL.

Further, the measurement mode setting device is further configured to set a third measurement mode; and when the controller determines that the current measurement mode is the third measurement mode, the controller controls the blood analyzer to agitate a pre-diluted blood sample, then controls the sample aspirator to aspirate a third sampling amount of the pre-diluted blood sample from the sample container on the sample rack, and controls the sample preparation device to prepare a third test sample.

Further, the controller is capable of further executing the following operations: (1) determining whether the current measurement mode is the third measurement mode; and (2) when the current measurement mode is determined to be the third measurement mode, controlling the first agitating device to agitate the pre-diluted blood sample in the sample container.

Further, the blood sample is a whole blood sample.

Further, the blood sample analyzer further includes: a sample receiving assembly having a sample receiving cover and a sample container fixing hole, for individually feeding a single blood sample placed in the sample container fixing hole; and/or a sample conveying device for conveying the sample rack loaded with the first sample container and/or the second sample container.

Further, the controller is capable of further executing the following operations: (1) determining whether a current feeding mode is a first feeding mode or a second feeding mode; (2) when the current feeding mode is determined to be the first feeding mode, controlling the sample conveying device to convey the sample rack loaded with the sample container; and (3) when the current feeding mode is determined to be the second feeding mode, controlling the sample receiving assembly to convey the single sample container to the blood analyzer.

Further, the blood sample analysis method further includes: determining whether the current measurement mode is the first measurement mode or the second measurement mode; when the current measurement mode is determined to be the first measurement mode, aspirating a first sampling amount of the agitated blood sample from the first sample container, and preparing a first test sample; when the current measurement mode is determined to be the second measurement mode, aspirating a second sampling amount of the agitated blood sample from the second sample container, and preparing a second test sample; wherein the first sampling amount is less than the second sampling amount; and preferably, the first sampling amount is 5-50 μL, and more preferably 15-35 μL.

Further, the blood sample analysis method further includes: determining whether the current measurement mode is the third measurement mode; and when the current measurement mode is determined to be the third measurement mode, aspirating a third sampling amount of the agitated pre-diluted blood sample from the first sample container, and preparing a third test sample.

Further, the blood sample analysis method further includes: determining whether the current feeding mode is the first feeding mode or the second feeding mode; the current feeding mode is determined to be the first feeding mode, conveying, by the sample conveying device, the sample container; and when the current feeding mode is determined to be the second feeding mode, conveying, by the sample receiving assembly, the single sample container to the blood analyzer.

Further, the blood sample analysis method further includes obtaining, by the second agitating device, the second sample container for inverted agitating.

Further, in the measurement mode determination step, whether the current measurement mode is the third measurement mode is further determined; the blood sample analysis method further includes third test sample preparation step: when the current measurement mode is determined to be the third measurement mode, controlling the first agitating device to agitate the pre-diluted blood sample in the sample container, and aspirating a third sampling amount of the pre-diluted blood sample to prepare a third test sample; and in the test step, the third test sample is tested.

Further, the blood sample analysis method further includes: feeding mode determination step: determining whether the current feeding mode is the first feeding mode or the second feeding mode; sample rack convey step: when the current feeding mode is determined to be the first feeding mode, controlling the sample conveying device to convey the sample rack loaded with the sample container to a predetermined position, and to convey the agitated sample container to a first sampling position; and sample receiving assembly closing step: when the current feeding mode is determined to be the second feeding mode, closing the sample receiving assembly, to convey the sample container to a second sampling position.

Further, in the first test sample preparation step, the second agitating device conveys the sample container on the sample rack, which is conveyed by the sample conveying device to the predetermined position, to a first agitating position for agitating; and in the second test sample preparation step, the second agitating device grabs the sample rack or the sample container on the sample rack, which is conveyed by the sample conveying device to the predetermined position, for inverted agitating.

Further, the sample aspirator further includes a suction and discharge driving device for driving the sample aspirating needle to suction and discharge the blood sample in the sample container for agitating.

Further, the suction and discharge driving device is a syringe.

Further, the blood analyzer includes an agitating device capable of inversely agitating a common-volume blood sample.

Further, the suction and discharge driving device is capable of driving the sample aspirating needle to suction an appropriate amount of air before agitating the blood sample in the sample container, so that an isolated air column is formed inside the sample aspirating needle.

Further, the sample aspirator further includes an air-drying device for the sample aspirating needle, which is configured for air-drying an outer wall of the sample aspirating needle.

Further, the sample aspirator further includes a position sensor for the sample aspirating needle, which is configured for sensing a down position of the sample aspirating needle.

Further, the blood sample agitating method further includes: determining whether the current feeding mode is the first feeding mode or the second feeding mode; if the feeding mode is determined to be the first feeding mode, conveying, by the sample conveying device, the sample container on the sample rack to a first sampling position; and if the feeding mode is determined to be the second feeding mode, conveying, by the sample receiving assembly, the sample container individually to a second sampling position.

Further, the blood sample agitating method further includes: air-drying the outer wall of the sample aspirating needle before the sample aspirating needle aspirates an appropriate amount of air.

The devices and methods disclosed based on the above technical solutions can effectively achieve uniform stirring of a small-volume sample such as a peripheral blood sample, and can simultaneously solve the technical problem of affecting measurement results due to insufficient sample aspirating of the analyzer caused by loss of a small-volume sample such as peripheral blood remaining on rubber cap, and can also miniaturize the analyzer while solving the existing technical problems. In addition, the problem of fall-off of the bar code label can also be solved.

BRIEF DESCRIPTION OF THE DRAWINGS

FIG. 31 is a data analysis diagram of small-volume whole blood samples, each of which has a volume of 100 μL;

FIG. 32 is a data diagram of HGB tested in a first measurement mode after 6 small-volume whole blood samples of different volumes are uniformly agitated with a first agitating device 11 according to a first embodiment of the present application;

DETAILED DESCRIPTION OF EMBODIMENTS

The embodiments of the present application will be described in detail below. The embodiments are exemplarily shown in the accompanying drawings. The same or similar reference signs denote the same or similar elements or elements having the same or similar functions. The embodiments described below with reference to the accompanying drawings are exemplary, and are merely used for interpreting the present application, but should not be interpreted as limiting the present application.

Those skilled in the art can appreciate that, unless otherwise specifically stated, the singular forms "a", "an", "the" and "said" used herein may also include plural forms. It should be further appreciated that the term "include" used in the description of the present application indicates the existence of stated features, integers, steps, operations, elements and/or components, but do not exclude the existence or addition of one or more other features, integers, steps, operations, elements, components and/or combinations thereof. It should be appreciated that when one element is "connected" to another element, it may be connected to the another element directly or by an intermediate element. In addition, the "connected" used herein may include wireless connection. The term "and/or" used herein includes all or any unit and all combinations of one or more associated items listed.

It can be appreciated by those skilled in the art that, unless otherwise defined, all the terms (including technical terms and scientific terms) used herein have the same meanings as those understood by the person of ordinary skill in the art of the present application. It should also be appreciated that the terms such as those defined in a general dictionary should be interpreted as having meanings consistent with the meanings in the context of the prior art, unless specifically defined as here, otherwise they will not be interpreted by idealized or too formal meanings.

Considering that the amount of a peripheral blood sample collected is small and the fluidity thereof is poor, the peripheral blood often adheres to the bottom or wall of a blood collection tube and does not flow when the blood collection tube is inverted, and the inverted agitating easily causes spilling of the blood sample or loss of the blood sample, the traditional inverted agitating technology has difficulties in solving the problem of agitating the peripheral blood. Based on this, the present application proposes a method and device for automatically agitating a small-volume sample, and an analyzer with a function of automatically agitating a small-volume sample, which can agitate the small-volume sample by driving a stirring component to move in a sample container.

Embodiment 1

Figure 1:
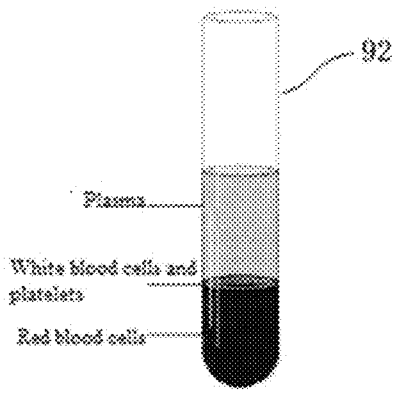
FIG. 1 is a schematic diagram of stratification of a blood sample in a blood collection tube.
Figure 2:
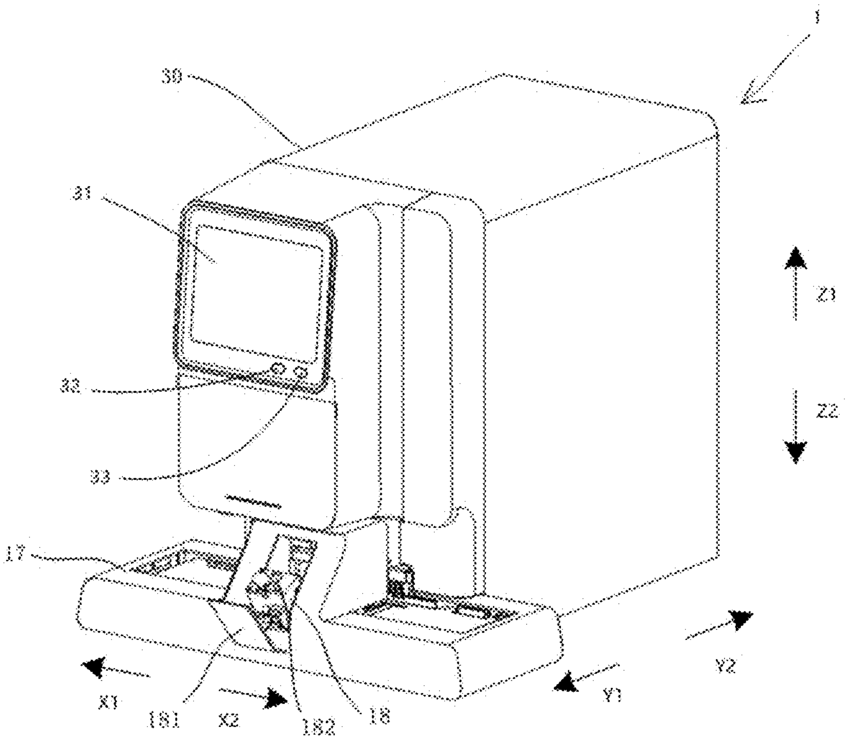
FIG. 2 is an appearance perspective view of a blood sample analyzer according to an embodiment of the present application.

FIG. 2 is appearance perspective view of a blood sample analyzer according to this embodiment. As shown in FIG. 2, the blood sample analyzer 1 includes a main body, a housing 30, a sample conveying device 17 arranged in front of the main body, etc. The housing 30 is provided with a display component 31, an operation button 32 and an operation button 33, etc. The display component 31 may be a touch screen for touch operation, and an input equipment 23 (such as a soft keyboard) can be displayed by touching the display component 31 (see FIG. 19). In this embodiment, the input equipment 23 may also be independently provided as hardware.

The main body may basically be accommodated in the housing 30, and includes a first agitating device 11 for agitating a blood sample in a sample container (blood collection tube) 91 and a second agitating device 12 for agitating a blood sample in a sample container (blood collection tube) 91 (92), a sample aspirator 13 for aspirating the blood sample agitated by the first agitating device 11 or the second agitating device 12 from the sample container 91 (92), a container rotating code scanning device (including a container pressing assembly 14, a container rotating assembly 15, and a code scanner 16) for acquiring sample code information of a label of a sample rack 80 conveyed by the sample conveying device 17 to a scanning position (not shown) and a label of the sample container 91 (92, 93, 94), a sample preparing device (not shown) for preparing a test sample from the blood sample aspirated by the sample aspirator 13, a tester (not shown) for testing blood cells in the blood from the test sample prepared by the sample preparing device, a controller 21 electrically connected to the display component 31, the operation button 32, the operation button 33 and corresponding components of the main body, etc.

Figure 17:
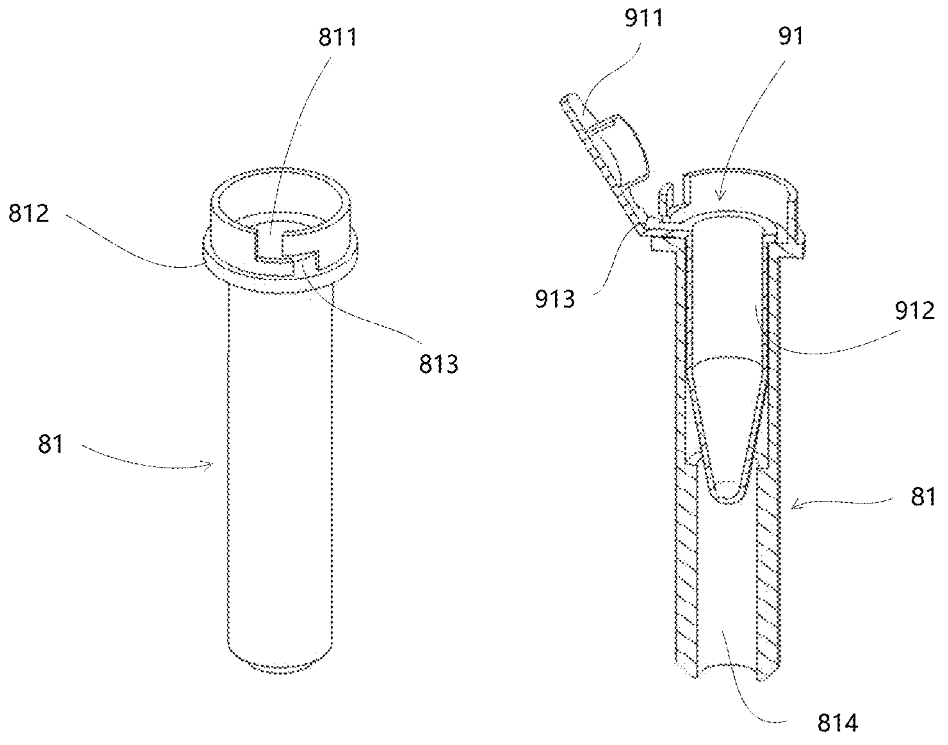
FIG. 17 is a schematic structural diagram of an adapter according to the present application.
Figure 18:
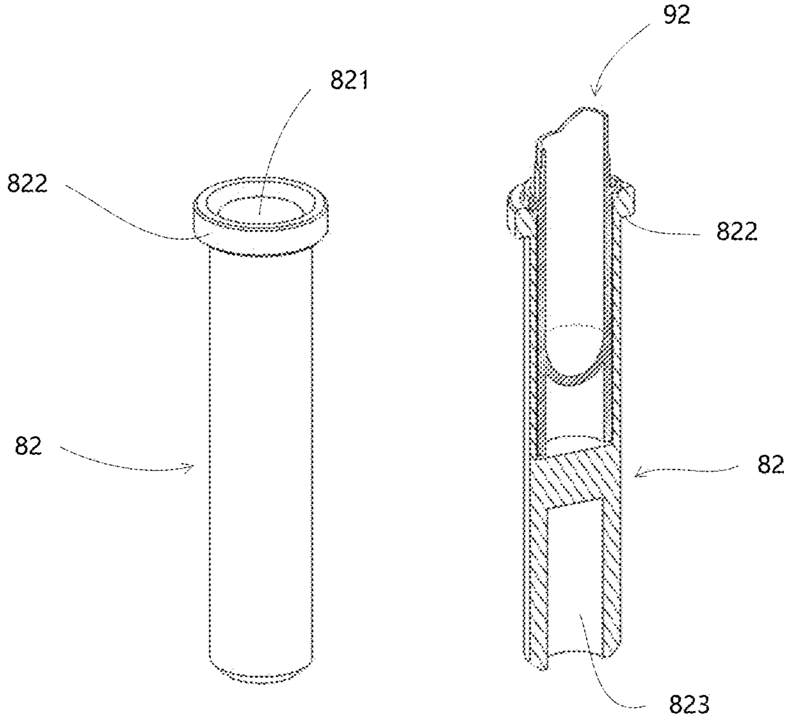
FIG. 18 is a schematic structural diagram of another adapter according to the present application.

In this embodiment, the blood sample analyzer 1 may further include a sample receiving assembly 18, which is used for individually feeding a single small-volume blood sample or a single common-volume blood sample, and is usually used for the measurement of emergency samples. The sample receiving assembly 18 is provided with a sample receiving cover 181 and a sample container receiving hole 182. When an emergency sample is required to be measured, the sample receiving cover 181 can be opened, so that the sample container containing the emergency sample can be placed into the sample container receiving hole 182 for fixing the sample container, or the sample container can be taken out from the sample container receiving hole 182. The diameter of the sample container receiving hole 182 is slightly larger than the outer diameter of the sample container or an adapter 81 (82) (see FIGS. 17 and 18) to be placed.

Figure 3:
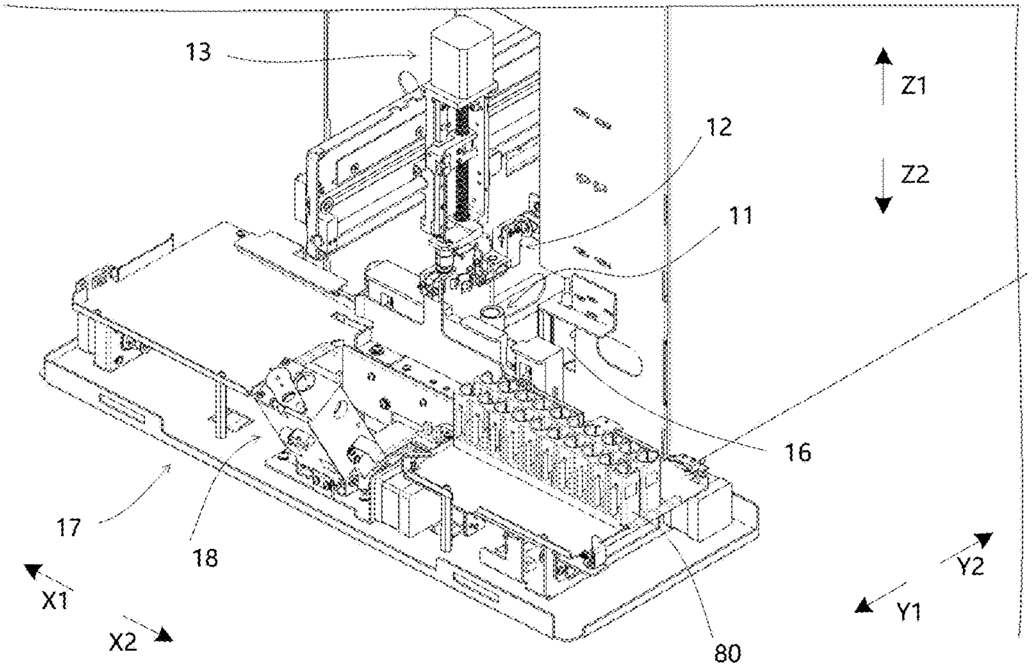
FIGS. 3 and 4 are schematic structural diagrams of a sample conveying device according to an embodiment of the present application.
Figure 4:
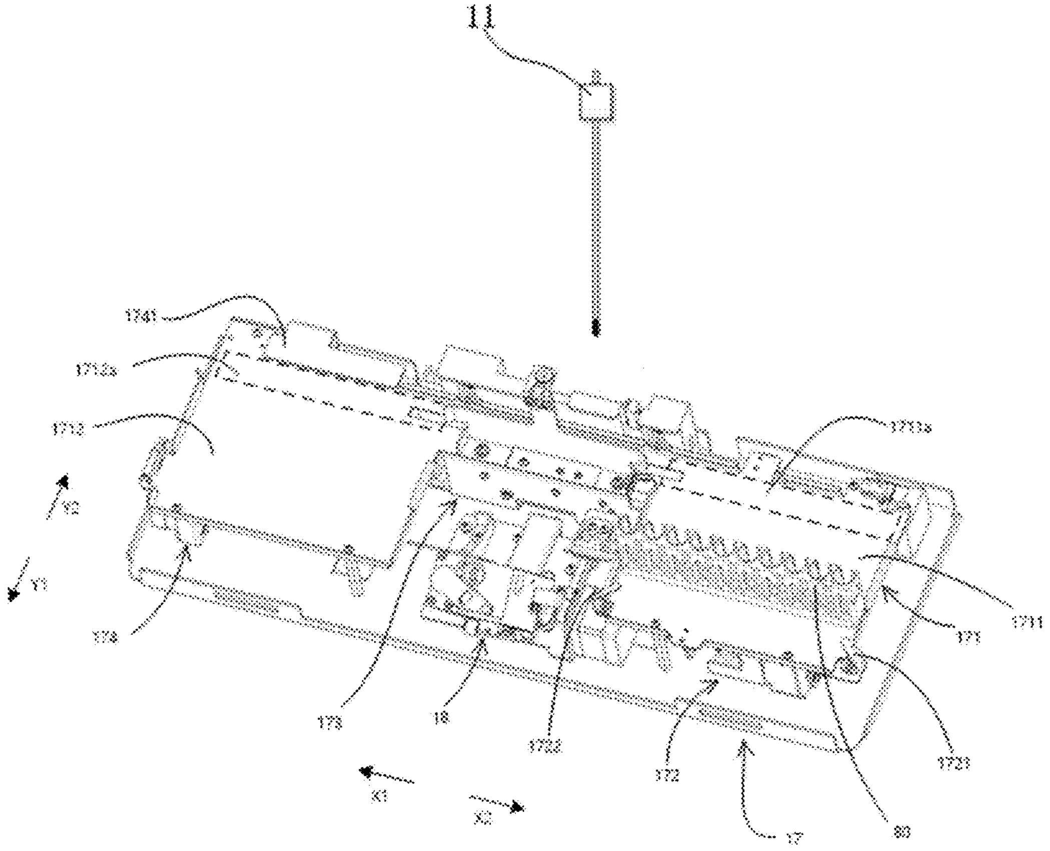

FIGS. 3 and 4 are schematic structural diagrams of the sample conveying device in this embodiment. As shown in FIG. 3, the sample conveying device 17 includes: a sample rack supporting component 171, a sample rack loading device 172, a sample rack bi-directional feeding device 173, and a sample rack unloading device 174.

The sample rack supporting component 171 includes: a pre-analysis sample rack storage section 1711 capable of storing a plurality of sample racks 80 holding sample containers containing pre-analysis samples, a post-analysis sample rack storage section 1712 capable of storing a plurality of sample racks 80 holding sample containers containing post-analysis samples, and a sample analysis section (not shown) between the pre-analysis sample rack storage section 1711 and the post-analysis sample rack storage section 1712. A sample rack loading turning section 1711*a* is on one side of the pre-analysis sample rack storage section 1711, and a sample rack unloading turning section 1712*a* is in the post-analysis sample rack storage section 1712.

The sample rack loading device 172 is provided with sample rack loading components 1721 and 1722. The sample rack loading components 1721 and 1722 can push the sample racks 80 stored in the pre-analysis sample rack storage section 1711 to the sample rack loading turning section 1711*a* one by one by moving in Y2 direction. The sample rack loading components 1721 and 1722 are driven by a stepper motor not shown. The sample rack 80 entering the sample rack loading turning section 1711*a* are further conveyed along X1 direction by the sample rack bi-directional feeding device 173. The sample containers 91 (92) containing samples that enter the analysis section are sequentially conveyed to a scanning position and scanned by the container rotating code scanning device 14-16, then the sample container 91 (92) conveyed to a predetermined position is conveyed to the first agitating device 11 or the second agitating device 12 for agitating, and the sample container 91 (92) after agitating is returned to the predetermined position and then conveyed to a sampling position, so that the sample aspirator 13 aspirates the blood sample agitated by the first agitating device 11 or the second agitating device 12 from the sample container 91 (92), and the sample preparing device prepares a test sample from the blood sample aspirated by the sample aspirator 13, and the tester tests blood cells in the test sample prepared by the sample preparing device.

After the sample rack 80 holding sample containers containing samples is conveyed by the sample rack bi-directional feeding device 173 to the sample rack unloading turning section 1712*a*, a sample rack unloading component 1741 of the sample rack unloading device 174 is moved horizontally along Y1 direction to push the sample rack 80 to the post-analysis sample rack storage section 1712. The sample rack unloading component 1741 is driven by a stepper motor not shown.

Figure 5:
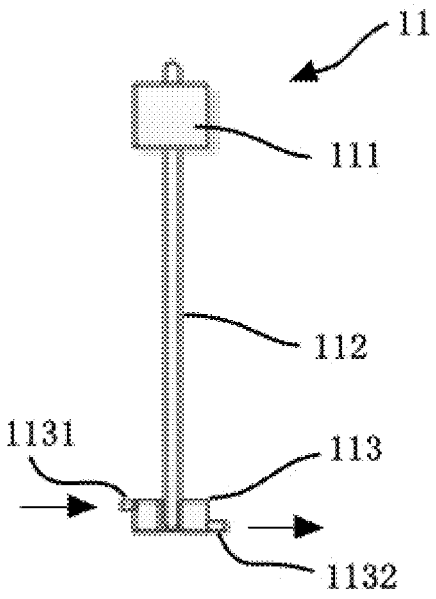
FIG. 5 is a schematic structural diagram of a first agitating device according to an embodiment of the present application.

FIG. 5 is a schematic structural diagram of the first agitating device in this embodiment. The first agitating device 11 is movably installed on the housing 30 of the blood sample analyzer 1 or other support (not shown), and can be moved up and down, and left and right or be rotated by driving through a motor. As shown in FIG. 5, the first agitating device 11 includes a stirring component driving motor 111, a sample stirring component 112, and a cleaning component 113. The stirring component motor 111 may be a stepper motor, a servo motor or a DC motor. In this embodiment, preferably, the motor 111 is a stepper motor.

The sample stirring component 112 may be a stirring rod having a cylindrical, paddle-shaped, or polygonal head, and performs stirring in one or a combination of rotation, circular orbit, linear swing, and up-and-down oscillation modes by driving through the stirring component motor 111. At the same time, the sample stirring component 112 can drive the agitating device 11 to move up and down, and left and right under the drive of a driving motor (not shown) for the agitating device.

The cleaning component 113 is used for cleaning the sample stirring component 112. In this embodiment, preferably, the cleaning component 113 includes a cleaning fluid inlet 1131 and a cleaning fluid outlet 1132. When the sample stirring component 112 has stirred blood sample in one blood sample container 91, the cleaning component 113 cleans the sample stirring component 112 therein to prevent contamination when stirring blood sample in next blood sample container. Specifically, when the sample stirring component 112 has stirred blood sample in one blood sample container 91, cleaning fluid is added through the cleaning fluid inlet 1131 to clean the sample stirring component 112, and the cleaning fluid is discharged through the cleaning fluid outlet 1132 after cleaning for recycling. At the same time, in this embodiment, after the sample stirring component 112 is cleaned with the cleaning fluid, the sample stirring component 112 can further be dried, for example, the sample stirring component 112 is air-dried by exhausting air through the cleaning fluid outlet 1132. Direct use of the cleaning fluid outlet 1132 for air exhausting and drying can save air-drying equipment and miniaturize the device.

In this embodiment, the sample stirring component 112 of the first agitating device 11 is driven to agitate sample in the sample container, so that components of respective layers of the whole blood sample in the sample container 91 can be quickly mixed. Moreover, during the mixing process, the bottom of the sample container 91 is kept lower than the opening of the container, a sampling needle of the analyzer 1 does not touch the blood sample in the sample container 91, and the agitating device 11 can uniformly agitate a small-volume sample without blood sample spilling and blood sample adhering to a tube cap.

In this embodiment, before the blood sample in the sample container 91 is stirred by using the first agitating device 11, a sealing cover of the sample container 91 needs to be opened, or the sample container 91 used does not have a sealing cover.

Preferably, the sample container 91 contains a small-volume blood sample having a volume usually more than or equal to 50 μL and less than or equal to 250 μL, for example, 100 μL; the sample contained in the sample container may be a whole blood sample or a pre-diluted sample; the sample contained in the sample container 91 may be small-volume peripheral blood or small-volume venous blood, and is suitable for being agitated by the first agitating device 11 as long as its volume is less than or equal to 250 μL, and the first agitating device 11 is particularly suitable for agitating a small-volume whole blood sample with a volume more than or equal to 50 μL and less than or equal to 200 μL.

Figure 6:
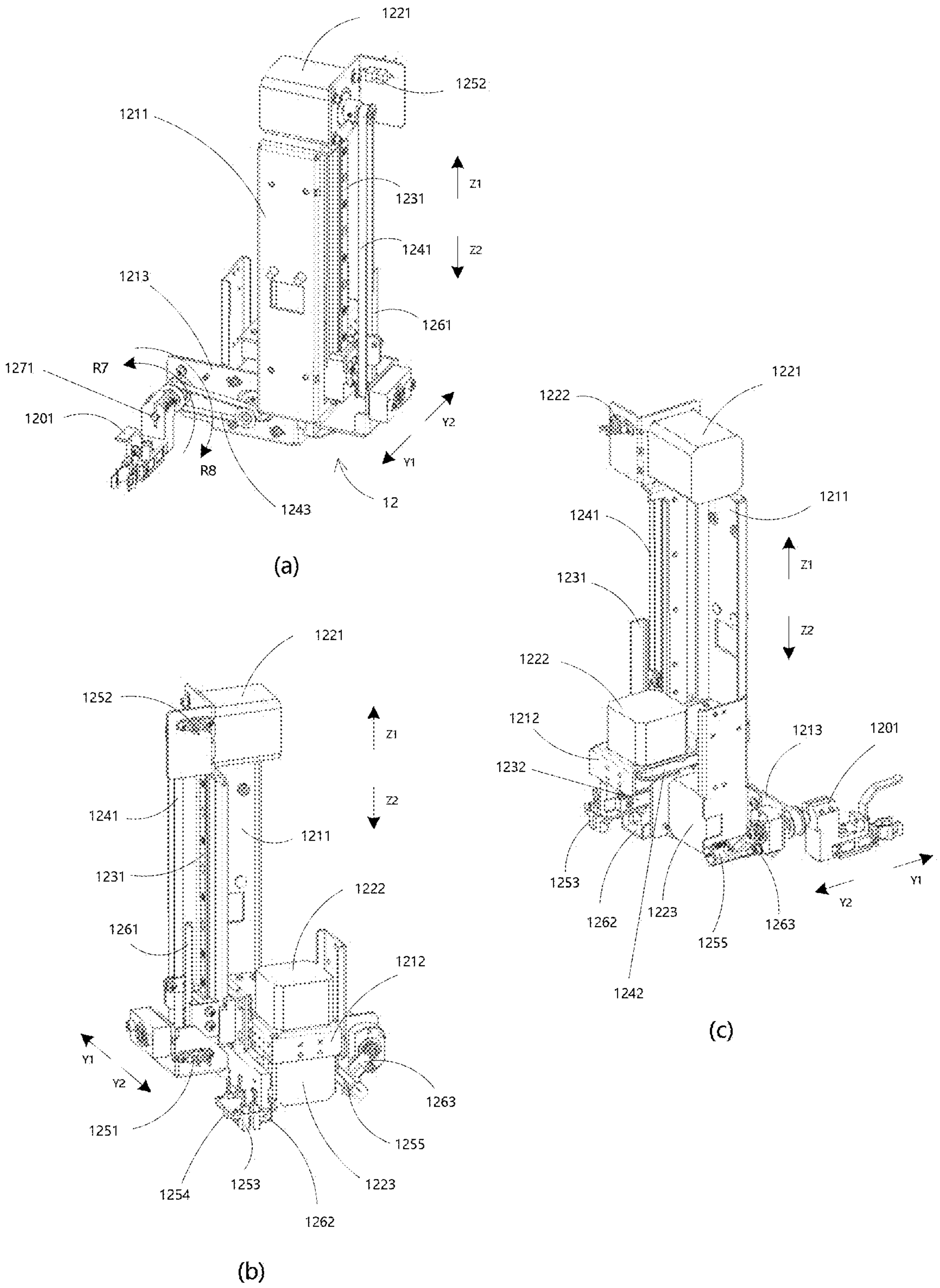
FIG. 6 is a schematic structural diagram of a second agitating device according to an embodiment of the present application.

FIG. 6 is a schematic structural diagram of the second agitating device according to this embodiment. The second agitating device 12 is capable of grabbing a common-volume blood sample container placed on the sample rack 80 and conveyed by the sample conveying device 17 to a predetermined position of the analyzer 1 and agitating the sample in the sample container in an inverted agitating way. The common-volume blood sample container may be a venous blood collection tube 92 or other type of venous blood collection tube; the common-volume blood sample container contains a second sample amount of sample (common-volume blood sample) that is significantly larger than the first sample amount (small-volume blood sample), and the second sample amount is usually more than or equal to 1 mL; and the sample in the common-volume blood sample container is a venous whole blood sample.

As shown in FIG. 6, the second agitating device 12 includes: a clamping jaw 1201, a first support frame 1211, a second support frame 1212, a third support frame 1213, stepper motors 1221-1223, linear slide rails 1231 and 1232, ring-shaped synchronous toothed belts 1241-1243 wound around synchronous wheels, position sensors 1251-1255, sensor chips 1261-1263, and a rotating shaft 1271.

The first support frame 1211 is a main support of the second agitating device 12 and is used to fix the stepper motor 1221, the linear slide rail 1231 and the position sensors 1251-1252, and the first support frame 1211 is fixed to a front plate of the analyzer 1 by screws; the linear slide rail 1231 is placed along Z1 and Z2 directions, and the second support frame 1212 and the sensor chip 1261 are connected to a slider of the linear slide rail 1231 and can slide in Z1 or Z2 direction; the second support frame is used to fix the stepper motor 1222, the linear slide rail 1232, and the position sensors 1253-1254; the linear slide rail 1232 is placed along Y1 and Y2 directions, and the third support frame 1213 and the sensor chip 1262 are connected to a slider of the linear slide rail 1232 and can slide in Y1 or Y2 direction; the third support frame 1213 is used to fix the stepper motor 1223 and the position sensor 1255, the rotating shaft 1271 is rotatably fixed on the third support frame 1213, and the rotating shaft 1271 is rotatable in R7 or R8 direction; and the clamping jaw 1201 and the sensor chip 1263 are fixedly connected to the rotating shaft 1271, and can follow the rotating shaft 1271 to rotate in R7 or R8 direction.

The ring-shaped synchronous toothed belt 1241 is driven by the rotation of the stepper motor 1221 and rotates under the guidance of two synchronous wheels. The second support frame 1212 is connected to the ring-shaped synchronous toothed belt 1241, and the second support frame 1212 can drive the clamping jaw 1201 and the sensor chip 1261 to move in Z1 or Z2 direction under the drive of the stepper motor 1221; the position sensors 1251 and 1252 cooperate with the sensor chip 1261 to position the clamping jaw 1201 in Z1 or Z2 direction. When the second support frame 1212 drives the clamping jaw 1201 to move in Z1 direction, the clamping jaw 1201 is positioned using the position sensor 1252, and when the second support frame 1212 drives the clamping jaw 1201 to move in Z2 direction, the clamping jaw 1201 is positioned using the position sensor 1251.

The ring-shaped synchronous toothed belt 1242 is driven by the rotation of the stepper motor 1222 and rotates under the guidance of two synchronous wheels. The third support frame 1213 is connected to the ring-shaped synchronous toothed belt 1242, and the third support frame 1213 can drive the clamping jaw 1201 and the sensor chip 1262 to move in Y1 or Y2 direction under the drive of the stepper motor 1222; the position sensors 1253 and 1254 cooperate with the sensor chip 1262 to position the clamping jaw 1201 in Y1 or Y2 direction. When the third support frame 1213 drives the clamping jaw 1201 to move in Y1 direction, the clamping jaw 1201 is positioned using the position sensor 1254, and when the third support frame 1213 drives the clamping jaw 1201 to move in Y2 direction, the clamping jaw 1201 is positioned using the position sensor 1253.

The ring-shaped synchronous toothed belt 1243 is driven by the rotation of the stepper motor 1223 and rotates under the guidance of two synchronous wheels. The rotating shaft 1271 drives the clamping jaw 1201 to rotate in R7 or R8 direction under the drive of the stepper motor 1223; and the position sensor 1255 cooperates with the sensor chip 1263 to position the clamping jaw during movement in R8 direction.

Figure 7:
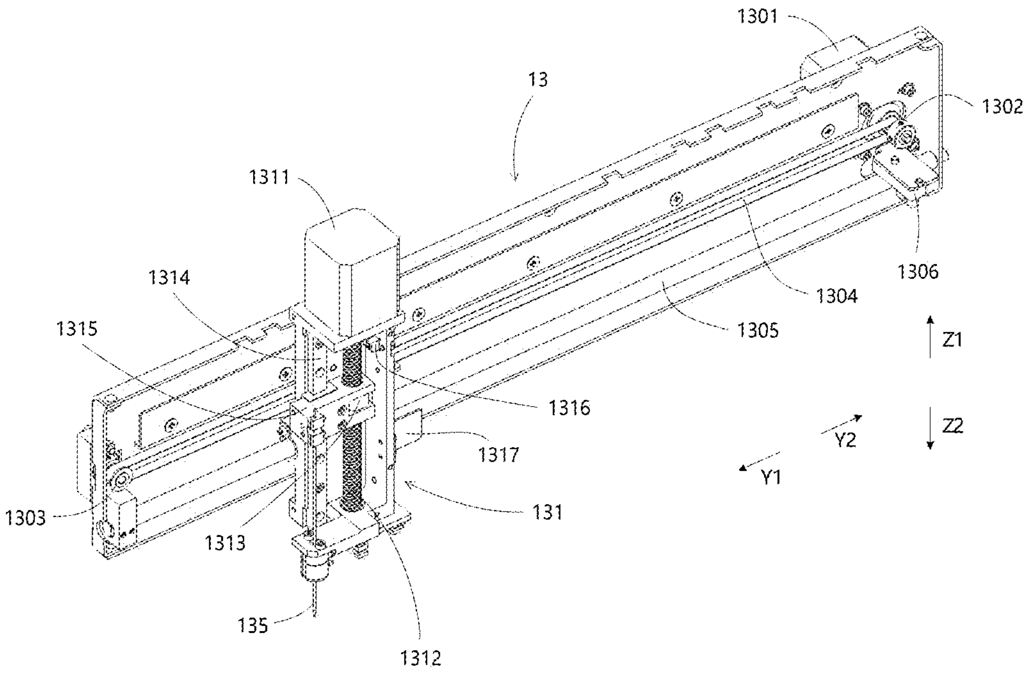
FIG. 7 is a schematic structural diagram of a sample aspirator according to an embodiment of the present application.

FIG. 7 is a schematic structural diagram of the sample aspirator according this embodiment. As shown in FIG. 7, the sample aspirator 13 is used to aspirate the blood sample from the sample container 91 (92) conveyed by the sample conveying device 17 to the sampling position of the analyzer 1 for sample preparation.

As shown in FIG. 7, the sample aspirator 13 includes: a sample aspirating needle 135, a sample aspirating needle moving assembly 131, a stepper motor 1301, synchronous wheels 1302 and 1303, a ring-shaped synchronous toothed belt 1304 wound around the synchronous wheels 1302 and 1303, a linear guide rod 1305 placed along Y1 and Y2 directions, a position sensor 1306, etc.

The sample aspirating needle moving assembly 131 is connected to the ring-shaped synchronous toothed belt 1304 by a connector. The ring-shaped synchronous toothed belt 1304 is driven by the rotation of the stepper motor 1301 and rotates under the guidance of the two synchronous wheels 1302 and 1303. The sample aspirating needle moving assembly 131 can drive the sample aspirating needle 135 to move in Y1 or Y2 direction under the drive of the stepper motor 1301. The initial position of the sample aspirating needle moving assembly 131 in Y1 or Y2 direction is positioned by the position sensor 1306 and a sensor chip 1318 fixed on the sample aspirating needle moving assembly 131.

The sample aspirating needle moving assembly 131 includes: a stepper motor 1311, a screw rod 1312, a nut 1313, a linear slide rail 1314, a sample aspirating needle fixture 1315, a position sensor 1316, a sensor chip 1317, etc.

The sample aspirating needle 135 is fixed on the sample aspirating needle fixture 1315, the sample aspirating needle fixture 1315 is fixed on the linear slide rail 1314 placed in Z1 or Z2 direction by screws, the nut 1313 is stuck in a slot of the sample aspirating needle fixture 1315, and the nut 1313 and the sample aspirating needle fixture 1315 do not rotate relative to each other. The screw rod 1312 is connected to a rotating shaft of the stepper motor 1311 by screws. The stepper motor 1311 can drive the screw rod 1312 to rotate, and drive the sample aspirating needle fixture 1315 to make the sample aspirating needle 135 move in Z1 or Z2 direction. The initial position of the sample aspirating needle 135 in Z1 or Z2 direction is positioned by the position sensor 1317 and an optical coupling sensor chip (not shown) arranged on the sample aspirating needle fixture 1315.

Under the drive of the stepper motor 1301 and the stepper motor 1311, the sample aspirating needle 135 can move in two dimensions in Y1 or Y2 direction and Z1 or Z2 direction. The functions of aspirating the blood sample from the sample container and dispensing the blood sample to the sample preparing device can be realized.

Figure 10:
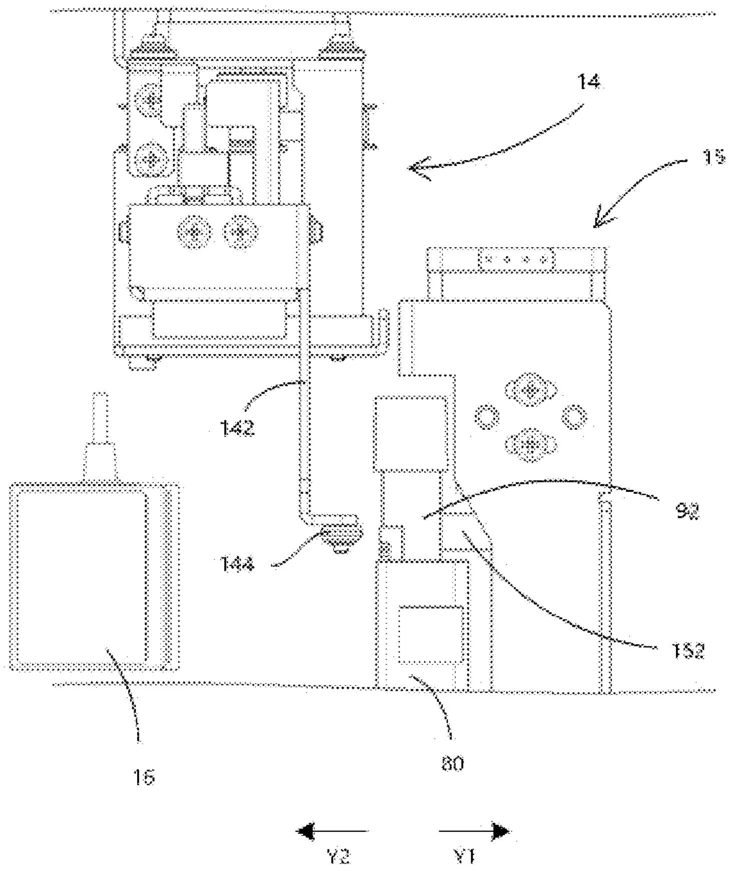
Figure 11:
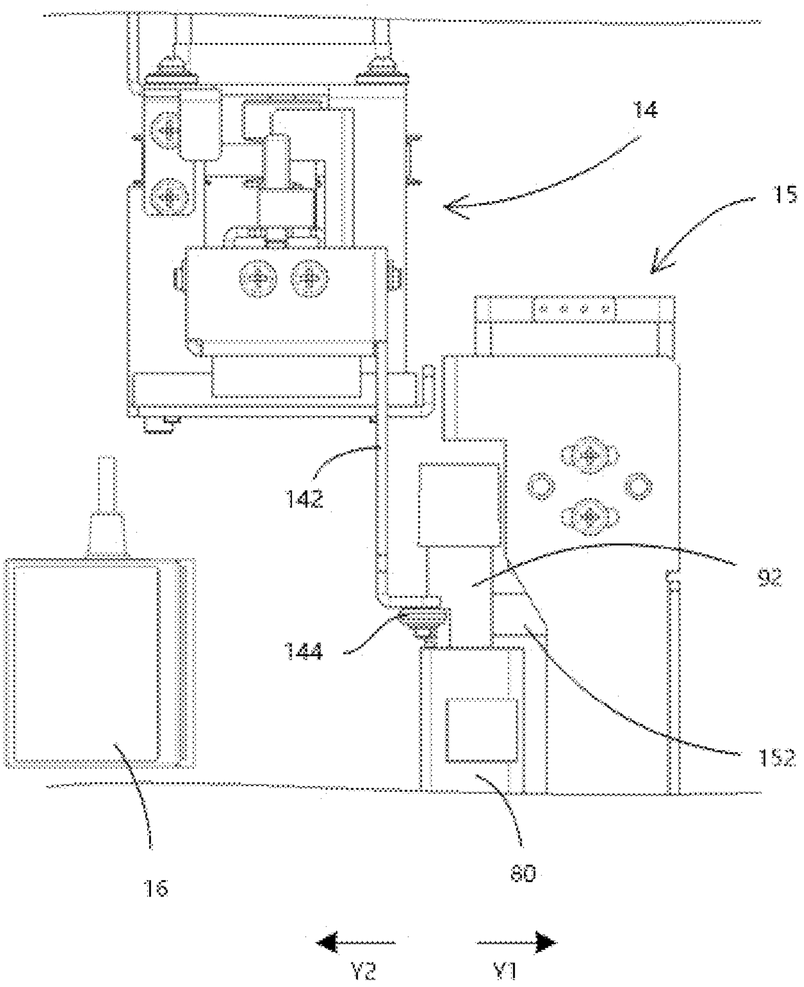
Figure 12:
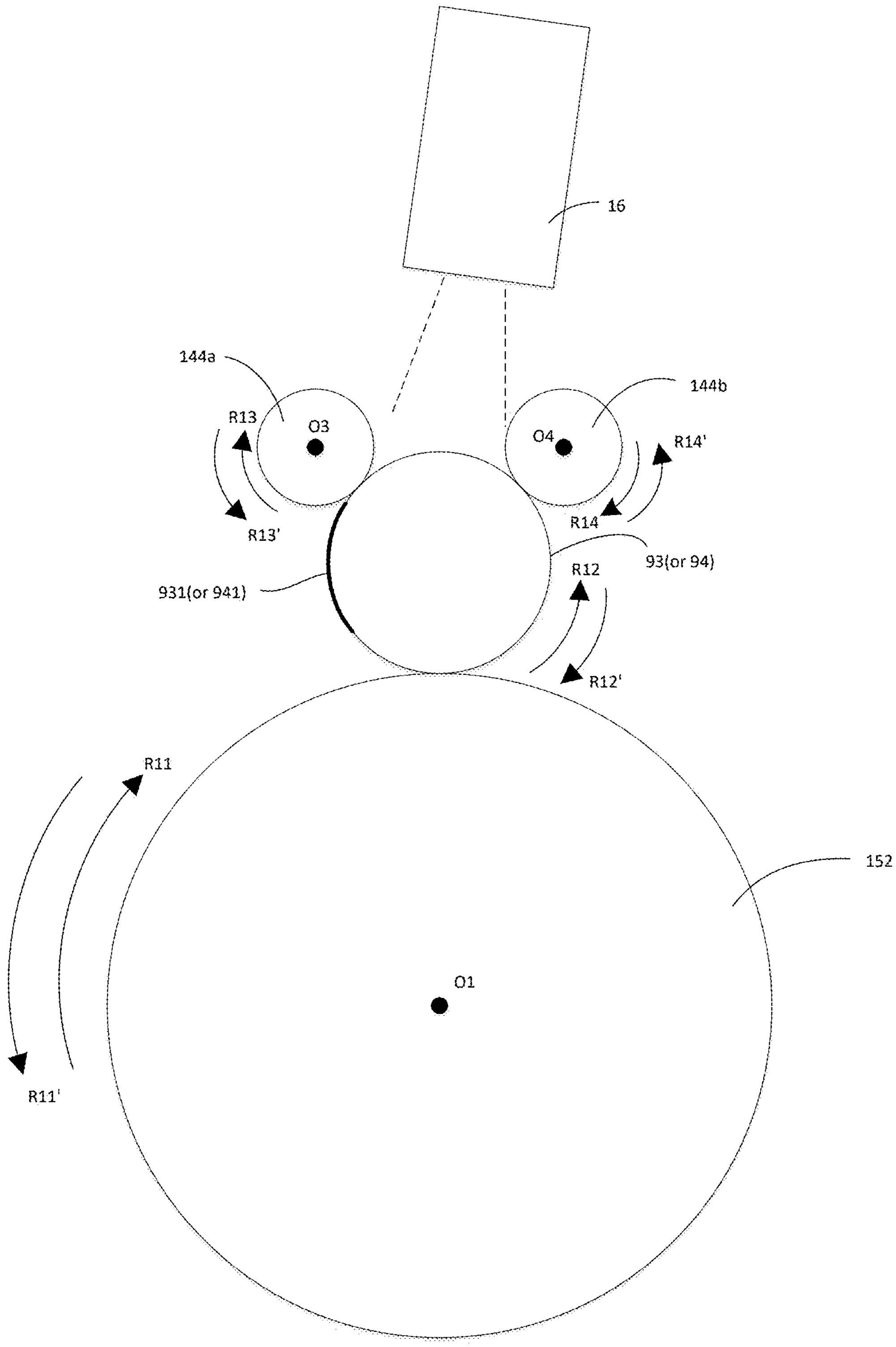
FIGS. 12 and 13 are working principle diagrams of a container rotating code scanning device according to an embodiment of the present application.
Figure 13:
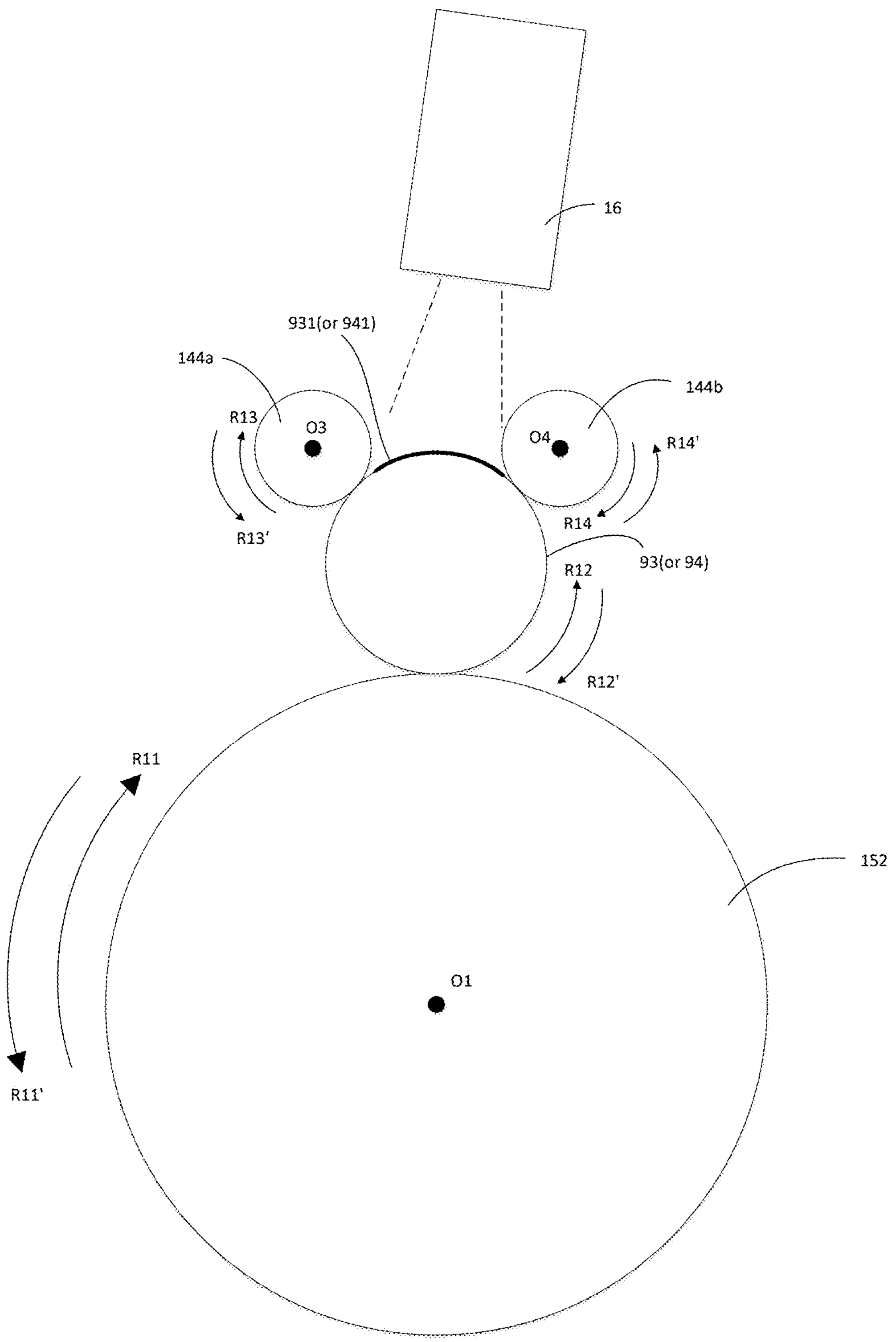

FIGS. 8-11 are schematic structural diagrams of the container rotating code scanning device according to this embodiment; and FIGS. 12-13 are schematic diagrams for illustrating the working principle of the container rotating code scanning device according to this embodiment.

The container rotating code scanning device 14-16 (wherein 14 is the container pressing assembly, 15 is the container rotating assembly, 16 is the code scanner) is used to read code information of the sample from the label of the sample container conveyed by the sample conveying device 17 to the scanning position of the analyzer 1, and is used for sample information management of the analyzer.

Figure 8:
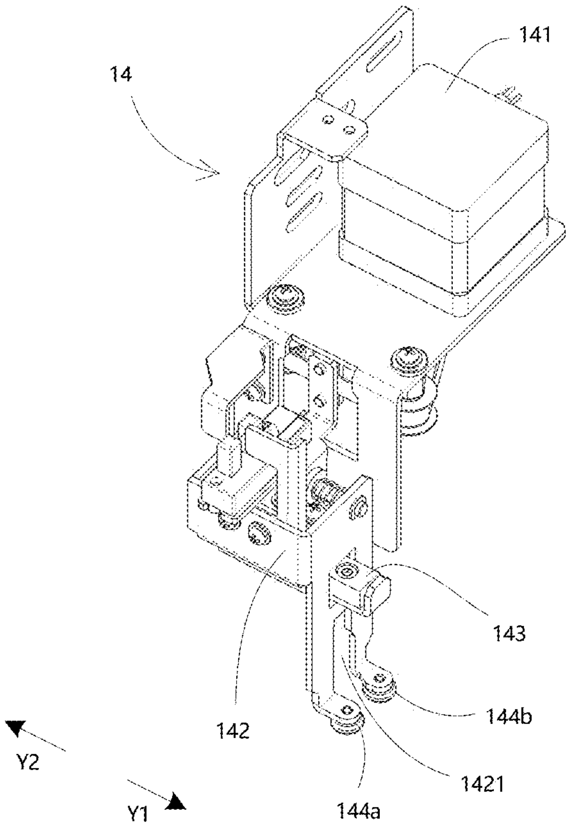
FIGS. 8-11 are schematic structural diagrams of a container rotating code scanning device according to an embodiment of the present application.

As shown in FIG. 8, the container pressing assembly 14 includes: a stepper motor 141, a follower wheel support 142, a linear slide rail 143, and two follower wheels **144*a* and 144*b*. The follower wheels 144*a* and 144*b* are rotatably fixed on the follower wheel support 142, and the follower wheel support 142 is fixed on a slider of the linear slide rail 143. The linear slide rail 143 is arranged along Y1 or Y2 direction. Under the drive of the stepper motor 141, the follower wheel support 142 can drive the follower wheels 144*a* and 144*b* to move in Y1 or Y2 direction. In addition, the follower wheel support 142 is provided with a notch 1421 for avoiding blocking a scan window of the code scanner 16**.

Figure 9:
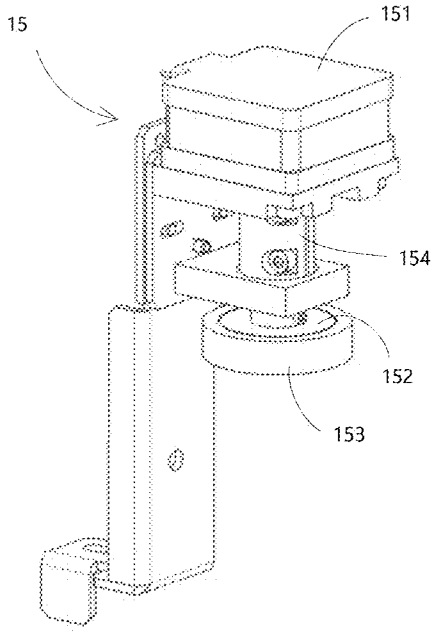

As shown in FIG. 9, the container rotating assembly 15 includes: a stepper motor 151, a rotating wheel 152, a rubber pad 153, and a coupling 154. The rotating wheel 152 is connected to a rotating shaft of the stepper motor 151 through the coupling 154. Under the drive of the stepper motor 151, the rotating wheel 152 can rotate counterclockwise or clockwise. The rubber pad 153 sleeved on an outer ring of the rotating wheel 152 is provided for increasing the friction between the rotating wheel 152 and the container.

As shown in FIG. 10, at the initial position of the container pressing assembly 14, under the drive of the stepper motor 141, the follower wheel support 142 can drive the follower wheels **144*a* and 144*b* to move in Y1 direction, to push the sample container 93 or 94 toward the rotating wheel 152 of the container rotating assembly 15 (see FIG. 11). At this time, if the rotating wheel 152 of the container rotating assembly 15 rotates about its central point O1 in R11 direction under the drive of the stepper motor 151, the sample container and the follower wheels 144*a* and 144*b* rotate about respective central axes O2, O3 and O4 in R12, R13 and R14 directions under the action of friction; or if the stepper motor 151 drives the rotating wheel 152 to rotate about its central point O1 in R11' direction, the sample container and the follower wheels 144*a* and 144*b* rotate about respective central axes O2, O3 and O4 in R12', R13' and R14' directions (see FIG. 12). During the rotation of the sample container, the bar code label pasted on the sample container will face the code scanner 16 in a certain phase, and the code scanner 16 can read numbering information of the bar code label on the sample container (see FIG. 13**).

In this embodiment, the container rotating code scanning device can support code scanning of sample containers that have appropriate heights and inner diameters, can be placed in a sample rack and can be pasted with bar codes on tube walls, preferably elongated sample containers.

Figure 14:
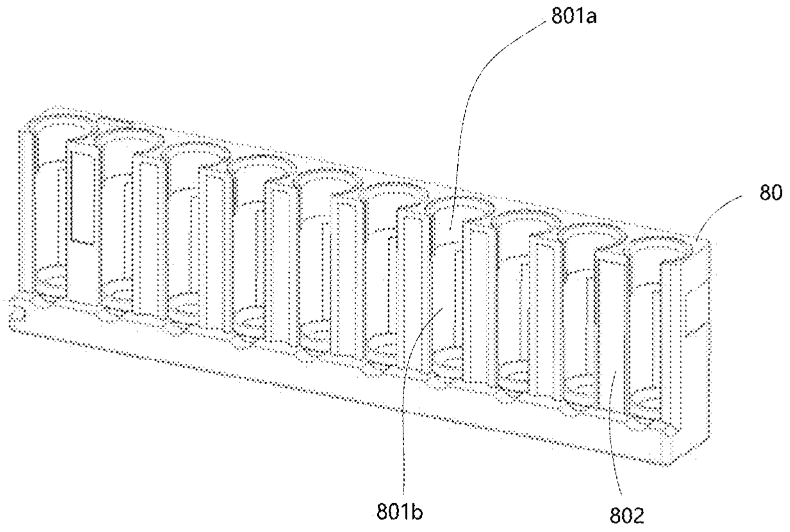
FIG. 14 is a schematic structural diagram of a sample rack according to the present application.

FIG. 14 is a schematic structural diagram of the sample rack according to this embodiment. As shown in FIG. 14, the sample rack 80 is provided with receiving holes **801*a* for fixing sample containers, each receiving hole 801*a* is correspondingly provided with an opening 801*b*, and the opening 801*b* is used as a scan window for the bar code label of the sample container. In addition, the sample rack 80 is provided with a special sample rack label pasting area 802, and a label such as a bar code label, two-dimensional code label, or RFID label can be pasted on the sample rack label pasting area 802. Preferably, the code information of the label on the sample rack 80** includes measurement mode information.

Figure 15:
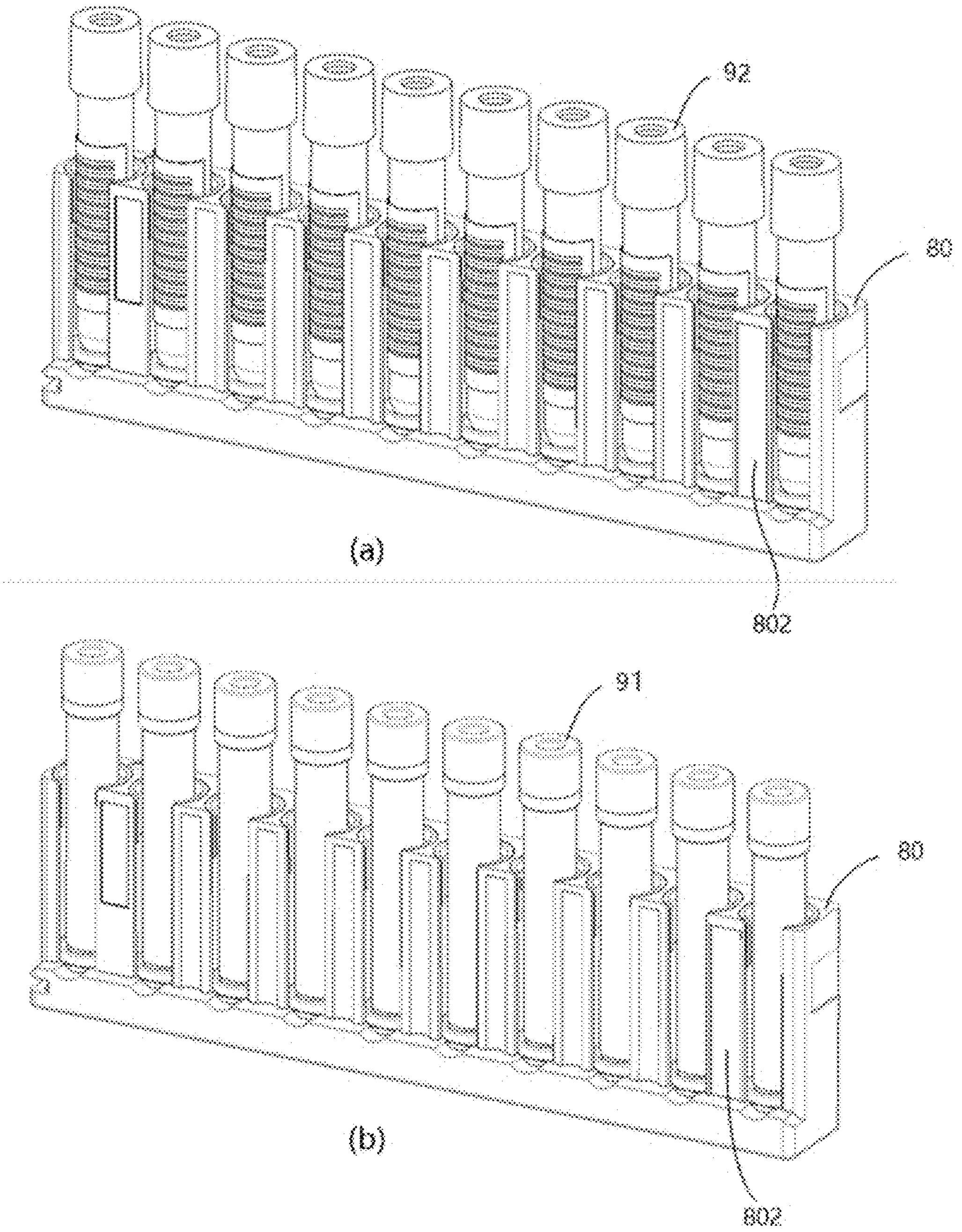
FIG. 15 is a schematic diagram of a sample rack loaded with sample containers according to the present application.
Figure 16:
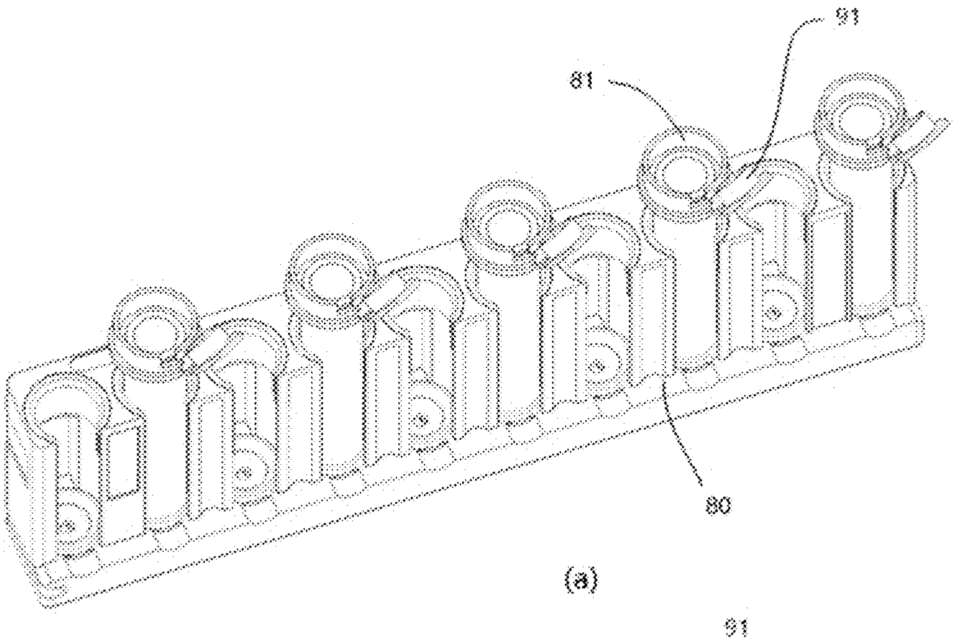
FIG. 16 is a schematic diagram of a sample rack loaded with small-volume blood collection tubes according to the present application.
Figure 16:
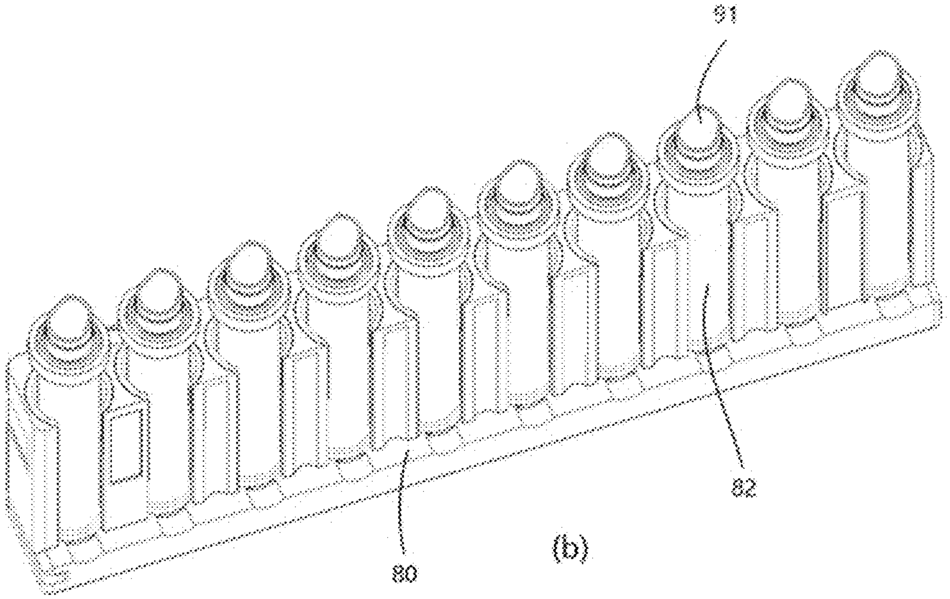

The sample rack 80 can directly hold a plurality of venous blood collection tubes 92 or small-volume blood collection tubes 91 (as shown in FIG. 15), or can hold small-volume blood collection tubes 91 through respectively an adapter 81 (as shown in FIG. 16).

The adapter 81 (see FIG. 17) is provided with a receiving hole 811 for fixing a small-volume blood collection tube 91, and a step portion 812 for preventing the adapter 81 from falling during the ascending of the clamping jaw 1201, and a cavity 814 is formed at the bottom in order to reduce the weight of the adapter. Compare to the adapter 82, the adapter 81 is provided with one more limiting portion 813 that can block the cap 911 of the small-volume blood collection tube 91. When the small-volume blood collection tube 91 is placed into the receiving hole 811 of the adapter 81, the connecting portion 913 of the small-volume blood collection tube 91 should be stuck into the limiting portion 813 of the adapter 81. Since the cap and body of the small-volume blood collection tube 91 are inseparable, in order to prevent the cap from turning toward the body under the restoring force of the connecting portion, the cap is limited by the limiting portion 813 of the adapter 81 to prevent the sample aspirating needle from puncturing the cap when entering the small-volume blood collection tube 91 to aspirate the sample. Preferably, in order to prevent the connecting portion of the small-volume blood collection tube 91 from escaping from the limiting portion 813 of the adapter 81 during the agitation of the adapter 81, the limiting portion 813 is Z-shaped. The diameter of the outer wall of the adapter 81 is smaller than the diameter of the receiving hole 801*a* of the sample rack 80, and the inner diameter of the receiving hole 811 of the adapter 81 is slightly larger than the outer diameter of the body of the fixed small-volume blood collection tube 91. The diameter of the outer wall of the adapter 81 can be equal to the diameter of the outer wall of the adapter 82.

The adapter 82 (see FIG. 18) is provided with a receiving hole 821 for fixing a small-volume blood collection tube 91, and a step portion 822 (having the same function as the step portion 812 of the adapter 81). In addition, the adapter 82 is provided with a cavity 823 at its bottom to reduce weight. The diameter of the outer wall of the adapter 82 is smaller than the diameter of the receiving hole 801*a* of the sample rack 80, and the inner diameter of the receiving hole 821 of the adapter 82 is slightly larger than the outer diameter of the body of the fixed small-volume blood collection tube 91.

For the above-mentioned small-volume blood collection tubes 91, no matter whether the peripheral blood is collected by capillary or by scraping, only a small amount of blood sample can be collected (≤100 μL in most cases, and 200-250 μL in a few cases).

In this embodiment, the sample container 91 may be one or more of the small-volume blood collection tubes, or other type of small-volume tube; the volume of the small-volume sample is usually ≤250 μL, preferably 30-250 μL, more preferably 50-200 μL, and still more preferably 50-100 μL; the small-volume sample may be a whole blood sample or a pre-diluted sample; and the small-volume sample may be a small-volume peripheral blood or a small-volume venous blood.

Figure 19:
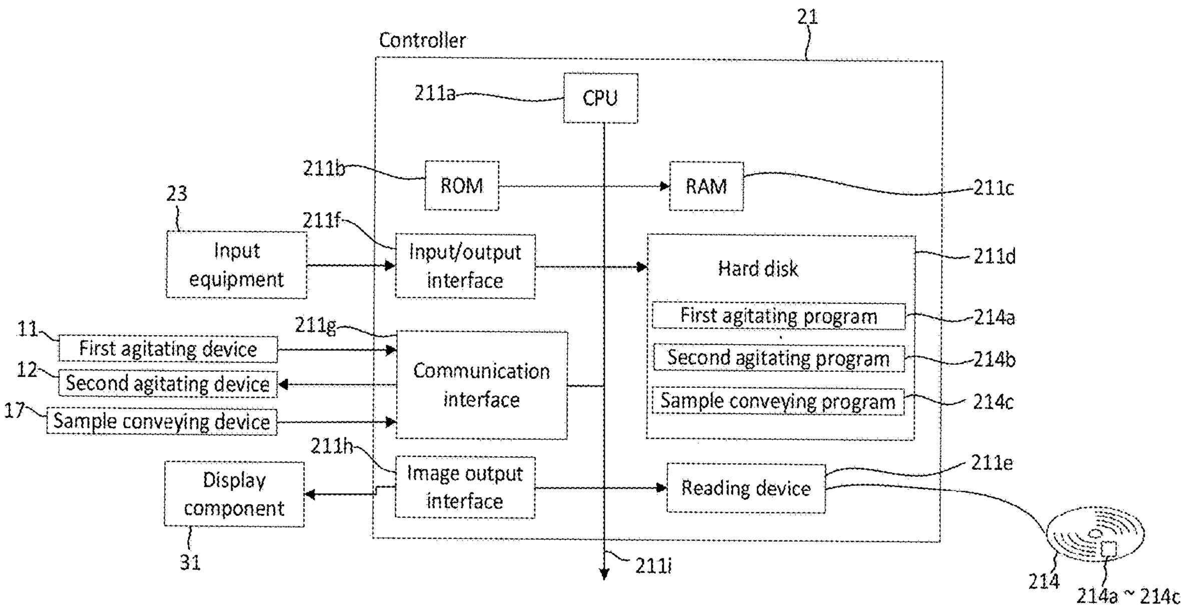
FIG. 19 is a structural block diagram of a controller according to the present application.

FIG. 19 is a structural block diagram of the controller 21. As shown in FIG. 19, the controller 21 is mainly composed of a CPU 211*a*, a ROM 211*b*, a RAM 211*c*, a hard disk 211*d*, a reading device 211*e*, an input/output interface 211*f*, a communication interface 211*g*, and an image output interface 211*h*. The CPU 211*a*, the ROM 211*b*, the RAM 211*c*, the hard disk 211*d*, the reading device 211*e*, the input/output interface 211*f*, the communication interface 211*g*, and the image output interface 211*h* are connected by a bus 211*i*.

The CPU 211*a* can execute computer programs stored in the ROM 211*b* and download the computer programs to the RAM 211*c*. The CPU 211*a* executes application programs 214*a*, 214*b* and 214*c* described later, thereby realizing the function of the controller 21.

The ROM 211*b* is composed of a mask ROM, PROM, EPROM, or EEPROM, and stores the computer programs executed by the CPU 211*a* and required data.

The RAM 211*c* is composed of a SRAM or DRAM. The RAM 211*c* is used to read the computer programs stored in the ROM 211*b* and the hard disk 211*d*. The RAM 211*c* may also be used as a workspace when the CPU 211*a* executes these computer programs.

The hard disk 211*d* is installed with various computer programs to be executed by the CPU 211*a*, such as an operating system and application programs, and data used when the computer programs are executed. A first agitating program 214*a* for the first agitating device 11, a second agitating program 214*b* for the second agitating device 12, and a sample conveying program 214*c* for the sample conveying device 17 are also installed in the hard disk 211*d*. The CPU 211*a* executes these application programs 214*a* to 214*c*, thus controlling the first agitating device 11, the second agitating device 12, and the sample conveying device 17.

The reading device 211*e* is composed of a floppy disk drive, a CD-ROM drive or a DVD-ROM drive or the like, and can read computer programs or data stored in a portable storage medium 214. The portable storage medium 214 stores the application programs 214*a* to 214*c*, and the controller 21 can read the application programs 214*a* to 214*c* from the portable storage medium 214, and can install these application programs 214*a* to 214*c* into the hard disk 211*d*.

The above-mentioned application programs 214*a* to 214*c* can be provided not only by the portable storage medium 214, but also from an external machine communicated with the controller 21 via an electronic communication line (whether wired or wireless).

An operating system that can provide a graphical user interface is installed in the hard disk 211*d*. In the following description, the application programs 214*a* to 214*c* are all run on the operating system.

The input/output interface 211*f* includes a serial interface, a parallel interface, and an analog interface including a D/A converter or an A/D converter. The input equipment 23 is connected to the input/output interface 211*f*, and a user can use the input equipment 23 to input data to the controller 21.

The communication interface 211*g* is a wired or wireless communication interface. The controller 21 can transmit data with the first agitating device 11, the second agitating device 12 and the sample conveying device 17 through the communication interface 211*g* by using a certain communication protocol.

The image output interface 211*h* is connected to the display component 31 composed of an LCD or CRT, and outputs image signals corresponding to image data received from the CPU 211*a* to the display component 31. The display component 31 displays an image (interface) according to the input image signals.

The controller 21 is configured to control the actions of the first agitating device 11, the second agitating device 12, and the sample conveying device 17 through the above structure.

Figure 20:
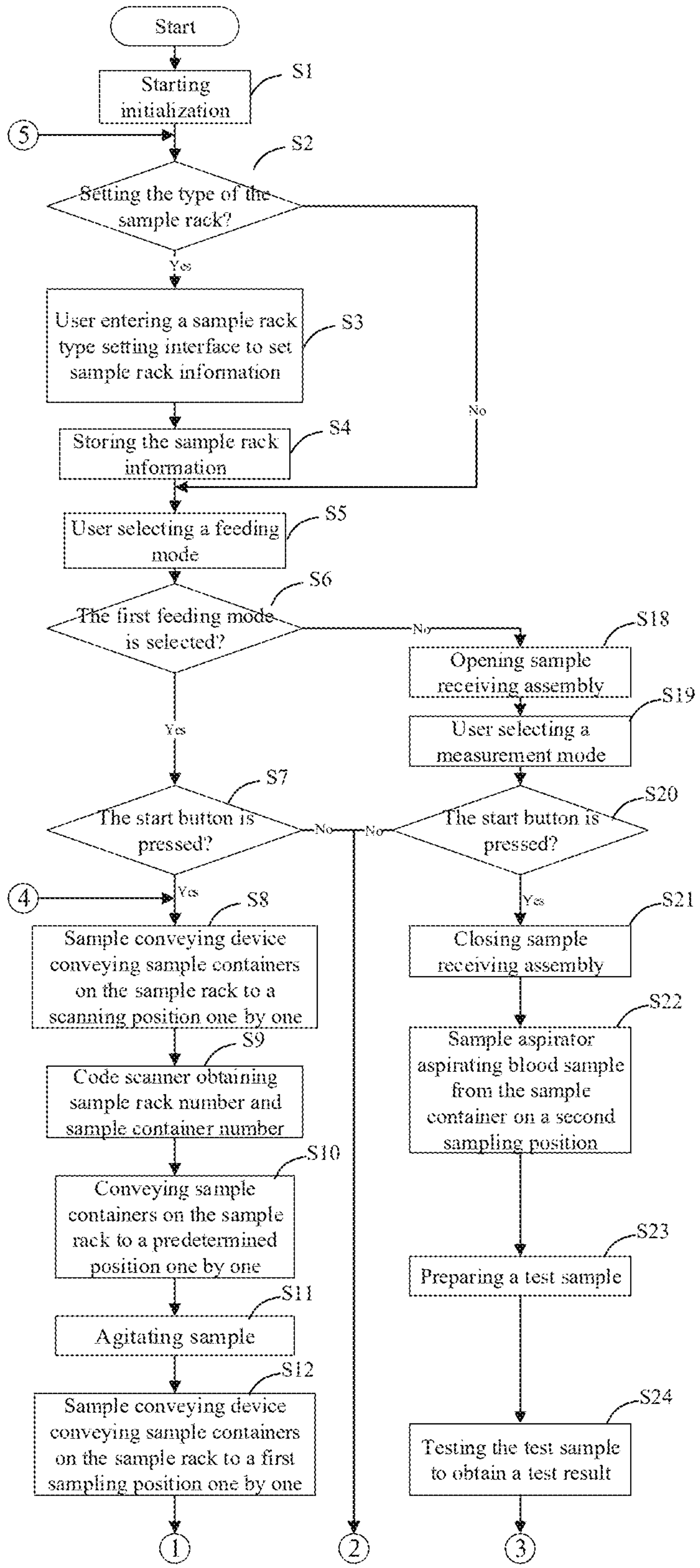
FIGS. 20 and 21 are main flowcharts of an example of analyzing and treating a blood sample by a blood sample analyzer according to the present application.
Figure 21:
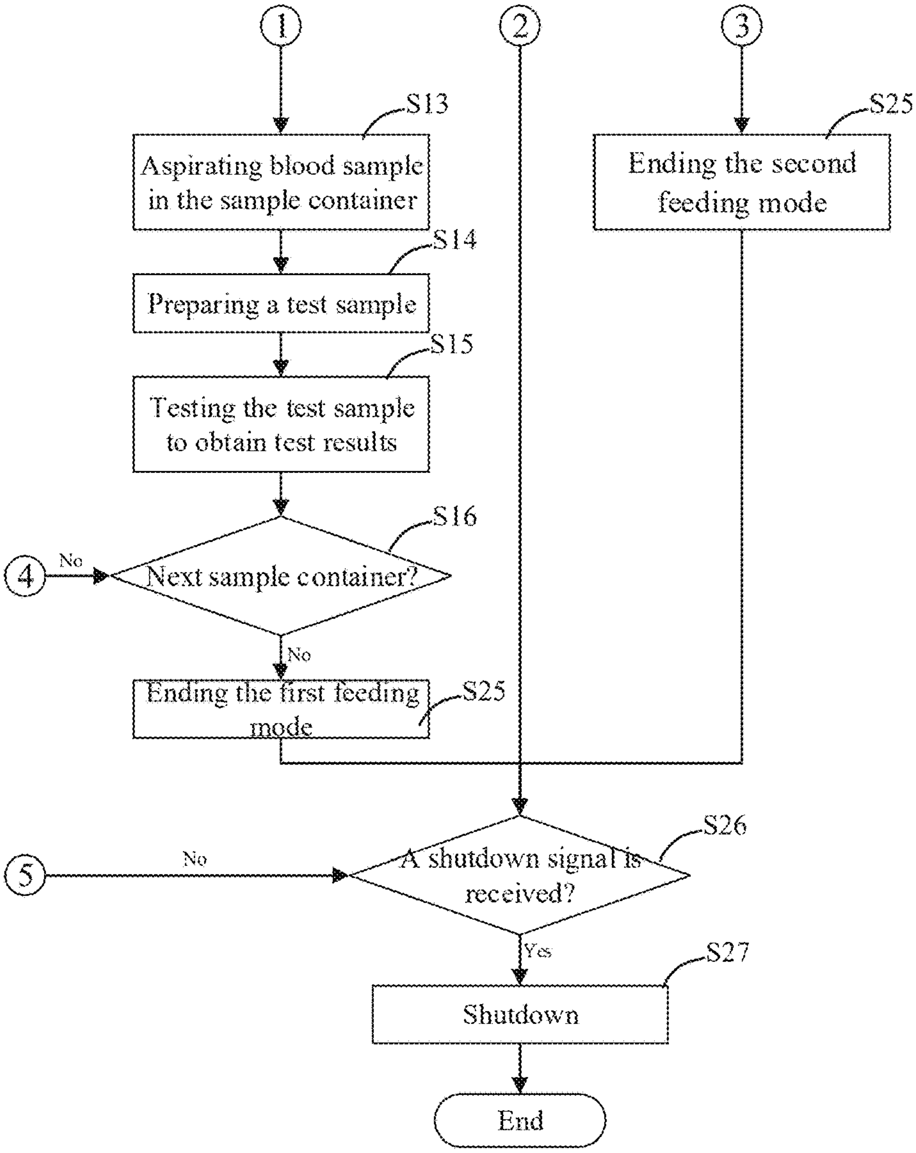

FIGS. 20 and 21 are main flowcharts of an example of analyzing a blood sample by the blood sample analyzer 1. As shown in FIGS. 20 and 21, the power of the blood sample analyzer 1 is first turned on, and the controller 21 starts initialization (step S1). In this initialization step, initialization of programs, initialization of fluid path components of the blood sample analyzer 1, cleaning of pipes, and resetting of driving components, etc. are performed.

Next, in step S2, the controller 21 determines whether a sample rack type setting is required. If the sample rack type setting is required (step S2: Yes), step S3 is performed. If the sample rack type setting is not required (step S2: No), step S5 is performed.

Next, in step S3, the display component 31 displays a sample rack type setting interface (see FIG. 22), and the user can set sample rack information through the sample rack type setting interface. Numbering of a sample rack 80 can be set in the first column of the interface, the sample rack 80 with the corresponding number can be set as a small-volume whole blood sample rack or a pre-diluted blood sample rack in the second column, and only one of the two can be selected at most. If the small-volume whole blood sample rack and pre-diluted blood sample rack are not checked, or the sample rack 80 is not numbered in the interface, the sample rack is treated as a common-volume blood sample rack by the blood analyzer 1. That is, when the small-volume whole blood sample rack or pre-diluted blood sample rack is checked, the sample containers on the sample rack 80 with the corresponding number are treated by the blood analyzer 1 as first sample containers 91; and when the small-volume whole blood sample rack and pre-diluted blood sample rack are not checked, or the sample rack 80 with sample containers are not numbered in the interface, such sample containers are treated by the blood analyzer 1 as second sample containers 92.

When small-volume whole blood is checked in the second column (first measurement mode), the sample aspirating needle 135 of the blood analyzer 1 aspirates the sample from the first sample container 91 on the sample rack 80 with the corresponding number, and it aspirates a first sampling amount of blood sample, for example, preferably 5-50 μL, more preferably 15-35 μL, and most commonly 30 μL; when pre-diluted is checked in the second column (third measurement mode), the sample aspirating needle of the blood analyzer 1 aspirates the sample from the first sample container 91 on the sample rack 80 with the corresponding number, and it aspirates a third sampling amount of blood sample, for example, 80 μL; when neither small-volume whole blood sample rack nor pre-diluted blood sample rack is checked (second measurement mode), the sample aspirating needle of the blood analyzer 1 aspirates the sample from the second sample container 92 on the sample rack 80 with the corresponding number, and it aspirates a second sampling amount of blood sample, for example, 50-300 μL, and most commonly 70 μL. Preferably, the first sampling amount is smaller than the second sampling amount.

Figure 22:
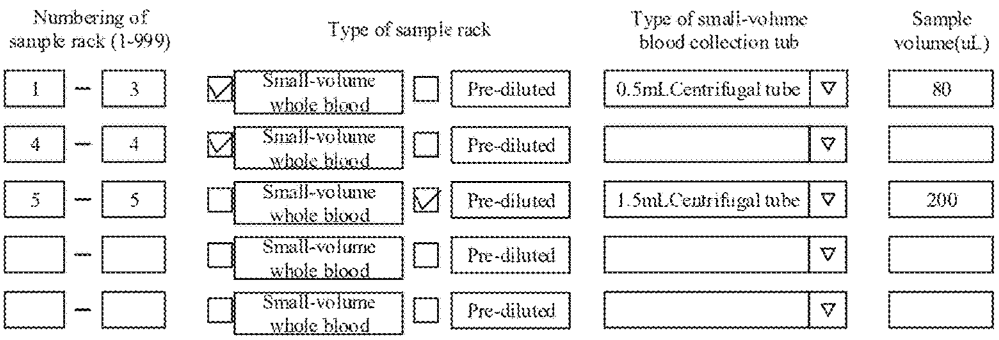
FIG. 22 is a schematic diagram of a setting interface of a blood analyzer according to the present application.

FIG. 22 shows a setting interface of the blood analyzer 1. As shown in FIG. 22, the user can call the setting interface through the display component 31, and set sample racks of some numbers as special sample racks for small-volume blood collection tubes. For any sample rack with a number input in the interface shown in FIG. 22, it will be treated by the blood analyzer 1 as a special sample rack for small-volume blood collection tubes, and the sample container 91 held on the special sample rack for small-volume blood collection tubes is conveyed by the conveying device to the first agitating device 11 for agitating (details will be described later). For any sample rack without a number input in the interface shown in FIG. 22, it will be treated by the blood analyzer 1 as a common sample rack for venous blood collection tubes, and the second agitating device 12 picks up the sample container 92 on the sample rack for agitating.

In the setting interface of the analyzer as shown in FIG. 22, the user can further set the type of small-volume blood collection tubes fixed on the special sample rack for the small-volume blood collection tubes (refer to the third column of FIG. 22, a plurality of common types of small-volume tubes are preset in software for selection), and volumes of samples contained in the small-volume blood collection tubes (refer to the fourth column of FIG. 22), and the controller 21 of the blood analyzer 1 automatically selects the rotation speed of the motor 111 of the first agitating device 11 for driving the sample stirring component 112 according to the user's setting, wherein the correlation between the type and size of the small-volume blood collection tube, the sample volume and the rotation speed of the motor is preset in a software program.

In the setting interface of the blood analyzer shown in FIG. 22, if the user sets sample racks with some numbers as special sample racks for small-volume blood collection tubes, but does not set corresponding types of small-volume blood collection tubes or sample volumes, the controller 21 of the blood analyzer 1 sets the rotation speed of the motor 111 of the first agitating device 11 for driving the sample stirring component 112 as a default rotation speed for agitating the sample containers on the sample racks with such numbers.

As shown in FIG. 22, for the sample racks numbered 1-5, the blood analyzer 1 will use the first agitating device 11 for agitating the samples in the sample containers on the sample racks; and for the sample racks not numbered 1-5, the analyzer 1 will use the second agitating device 12 for agitating the samples in the sample containers on the sample racks.

In one embodiment, the sample racks numbered 1-5 can be further distinguished: sample containers containing blood samples having different volumes, or sample containers of different shapes or sizes are placed on the sample racks numbered 1-3, 4 and 5, respectively; for the sample containers on the sample racks numbered 1-3, the motor 111 of the first agitating device 11 adopts a rotation speed of M1 rotations/turns for agitating; for the sample containers on the sample racks numbered 4, the motor 111 of the first agitating device 11 adopts a default rotation speed of M0 rotations/turns for agitating; and for the sample containers on the sample racks numbered 5, the motor 111 of the first agitating device 11 adopts a rotation speed of M2 rotations/turns for agitating.

The blood analyzer 1 treats all sample containers on the sample racks 80 numbered 1-5 as first sample containers 91, and treats all sample containers on the sample racks not numbered 1-5 as second sample containers 94. When the sample aspirating needle of the blood analyzer 1 aspirates samples from the sample containers 91 on the sample racks numbered 1-4, it aspirates a first sampling amount of blood sample (small-volume whole blood sample); when the sample aspirating needle of the blood analyzer 1 aspirates samples from the sample containers 91 on the sample racks 80 numbered 5, it aspirates a third sampling amount of blood sample (pre-diluted blood sample); and when the sample aspirating needle of the blood analyzer 1 aspirates samples from the sample containers 92 on the sample racks 80 not numbered 1-5, it aspirates a second sampling amount of blood sample (common-volume blood sample).

Returning to FIG. 20, the sample rack information is stored in step S4, and then step S5 is performed. In step S5, the user selects a feeding mode.

In step S6, the controller 21 determines whether a first feeding mode is selected. If the first feeding mode is determined to be selected (step S6: Yes), the controller 21 determines whether a start button (not shown) has been pressed (step S7). If the controller 21 determines that the start button has not been pressed (step S7: No), S25 is performed. If it is determined that the start button has been pressed (step S7: Yes), S8 is performed.

In step S8, the sample conveying device 17 conveys sample containers 91 (92) on a sample rack 80 to the scanning position (not shown) one by one, and the container rotating code scanning device (including the container pressing assembly 14, the container rotating assembly 15, and the code scanner 16) reads sample code information on labels of the sample containers 91 (92), scans the label of the sample rack 80 passing the scanning position, and reads code information of the label of the sample rack 80 (step S9).

The controller 21 controls the sample conveying device 17 to convey the sample containers 91 (92) on the sample rack 80 to a predetermined position 22 one by one (step S10).

The controller 21 controls the first agitating device 11 or the second agitating device 12 to agitate blood samples in the sample containers 91 (92) (S11). In step S11, the controller 21 determines, based on the code information read from the label of the sample rack 80, whether the current measurement mode is a first measurement mode, a second measurement mode, or a third measurement mode; if the controller 21 determines that the current measurement mode is the first measurement mode or the third measurement mode, the controller controls the agitating device 11 to move to agitate the blood sample in the sample container 91 on the sample rack 80 at the predetermined position 22 (first mixing position); and if the controller 21 determines that the current measurement mode is the second measurement mode, the controller controls the clamping jaw 1201 of the second agitating device 12 to grab the current sample container 92 from the sample rack 80 at the predetermined position to a certain position (second mixing position) (not shown), and controls the stepper motor 1223 of the second agitating device 12 to drive the clamping jaw 1201 to rotate, thereby agitating the blood sample in the current sample container. In other embodiments, the first agitating position can be set on the sample rack, that is, the hole on the sample rack is used as the first agitating position, and the stirring component is moved to this position for agitating the sample in the test tube at the first agitating position; or the first agitating position is a fixed position separately set relative to the sample rack, which facilitates better fixing of the test tube during the agitating operation. When the first agitating position is a fixed position separately set relative to the sample rack, a carrying device may be provided additionally to grab the first sample container and convey it to the first agitating position, or the grabbing mechanism of the second agitating device may be used as a carrying device to convey the first sample container. When the first agitating position can be set on the sample rack, preferably, as shown in FIG. 23, the controller 21 controls the container pressing assembly 14 to move so that the two driven wheels 144*a* and 144*b* clamp the sample container 91 (92) on the sample rack 80, and controls the sample stirring component 112 of the first agitating device 11 to move down (Z direction) and enter the blood sample in the sample container 91 (92) for agitating.

In this embodiment, in step S11, the clamping jaw 1201 of the second agitating device 12 can also grab the sample container 91 (92) from the sample rack 80 at the predetermined position 22 and move the same to the certain position, and then the first agitating device 11 is moved so that the sample stirring component 112 of the first agitating device 11 enters the sample container 91 grabbed by the clamping jaw 1201 for agitating.

Figure 23:
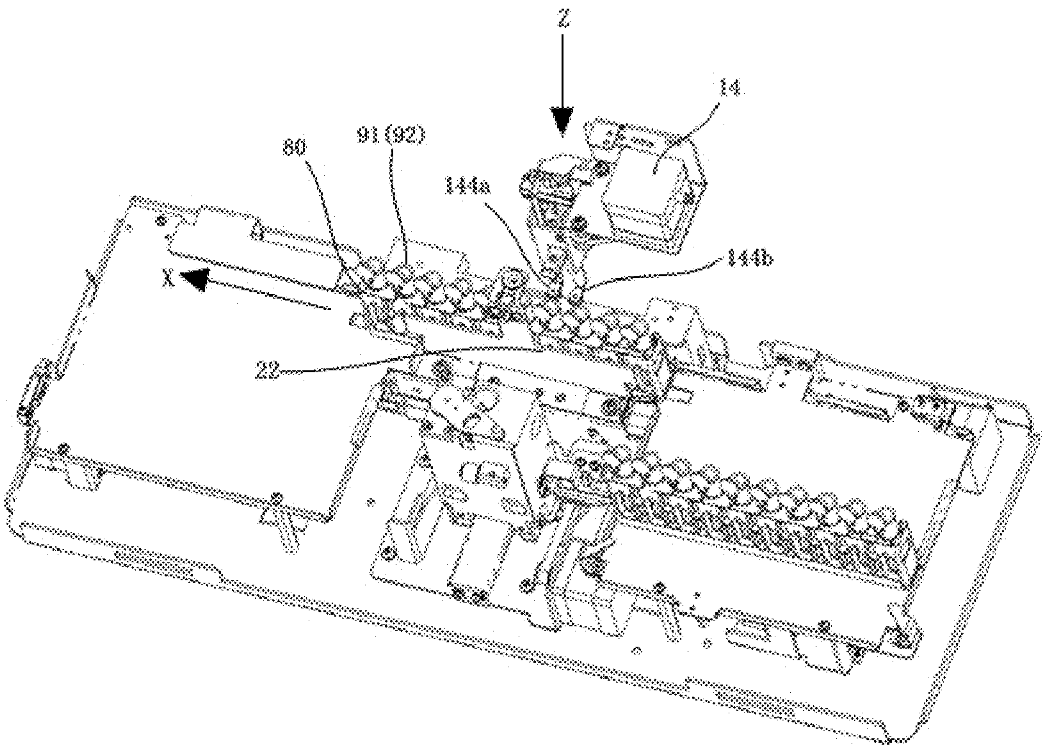
FIG. 23 is a schematic diagram of an agitating operation of a first agitating device according to an embodiment of the present application.

In this embodiment, preferably, as shown in FIG. 23, in step S11, when the controller 21 determines, according to the code information of the label of the sample rack 80, that the sample container on the current sample rack 80 is a sample container 91 containing a small-volume whole blood sample (or a pre-diluted small-volume blood sample), it controls the container pressing assembly 14 to move so that the two driven wheels 144*a* and 144*b* clamp the sample container 91 on the sample rack 80, and controls the sample stirring component 112 of the first agitating device 11 to move down (Z direction) and enter the blood sample in the sample container 91 for agitating; and when the controller 21 determines, according to the code information of the label of the sample rack 80, that the sample container on the current sample rack 80 is a sample container 92 containing a common-volume blood sample, it controls the second agitating device 12 to drive the clamping jaw 1201 to grab the sample container 92 from the sample rack 80 to a certain position and drive the same to rotate, so as to agitate (for example, inversely agitate) the blood sample in the sample container 92.

In this embodiment, the controller 21 can also control the container pressing assembly 14 to move so that the two driven wheels 144*a* and 144*b* clamp the sample container 91 on the sample rack 80 and move the same to a certain position, and control the sample stirring component 112 of the first agitating device 11 to move down (Z direction) and enter the blood sample in the sample container 91 for agitating.

The sample container 91 (92) containing the agitated blood sample is conveyed to the first sampling position (not shown) of the blood sample analyzer (S12), and then step S13 is performed.

In step S13, the controller 21 controls, according to the received measurement mode information, the sample aspirating needle 135 of the sample aspirator 13 to aspirate a predetermined amount of blood sample from the sample container 91 (92) on the sampling position. Specifically, in the first measurement mode, the sample aspirating needle 135 of the sample aspirator 13 aspirates a first sampling amount of blood sample from the first sample container 91; in the third measurement mode, the sample aspirating needle 135 of the sample aspirator 13 aspirates a third sampling amount of blood sample from the first sample container 91; and in the second measurement mode, the sample aspirating needle 135 of the sample aspirator 13 aspirates a second sampling amount of blood sample from the second sample container 92.

In step S14, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount.

In step S15, the tester of the blood sample analyzer 1 tests the test sample prepared by the sample preparing device to obtain test results. The controller 21 determines whether there is an untreated next sample container 91 (92) on the sample rack (step S16), and if there is an untreated sample container 91 (92) (step S16: Yes), the process returns to step S8 for corresponding treatment. If all the sample containers 91 (92) have been treated (step S16: No), the first feeding mode ends (step S17), and the step S26 is performed.

If the second feeding mode is determined to be selected (step S6: No), the sample receiving cover 181 will be opened (step S18). Regarding step S18, when the controller 21 is in the second feeding mode, if the sample receiving cover 181 is originally closed, step S18 is executed, and if the sample receiving cover 181 is originally opened, next step S19 is directly performed.

In step S19, the user selects the measurement mode of the current blood sample through the setting interface (not shown) of the blood analyzer 1.

The controller 21 determines whether the start button (not shown) has been pressed (step S20). If the controller 21 determines that the start button has not been pressed (step S20: No), step S26 is performed. If it is determined that the start button has been pressed (step S20: Yes), step S21 is performed, the sample receiving cover 181 is closed, and step S22 is performed.

In step S22, the controller 21 controls, according to the measurement mode information selected by the user in step S19, the sample aspirating needle 135 of the sample aspirator 13 to aspirate a predetermined amount of blood sample from the sample container 91 (92) on the second sampling position. Specifically, in the first measurement mode, the sample aspirating needle 135 of the sample aspirator 13 aspirates a first sampling amount of blood sample from the first sample container 91; in the third measurement mode, the sample aspirating needle 135 of the sample aspirator 13 aspirates a third sampling amount of pre-diluted blood sample from the first sample container 91; and in the second measurement mode, the sample aspirating needle 135 of the sample aspirator 13 aspirates a second sampling amount of blood sample from the second sample container 92. Preferably, the first sampling amount is less than the second sampling amount, for example, the first sampling amount is 5-50 μL, more preferably 15-35 μL.

In step S23, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount.

In step S24, the tester of the blood sample analyzer 1 tests the test sample prepared by the sample preparing device to obtain test results, the second feeding mode ends (step S25), and then step S26 is performed.

In step S26, if a shutdown instruction is not received (step S26: No), the process returns to step S2; and if a shutdown instruction is received (step S26: Yes), shutdown is performed (step S27), and the process ends.

The above embodiments can be used for blood analysis on main examination items involving red blood cells, white blood cells, and platelets in the blood routine, and in step S15, the tester tests the test sample prepared by the sample preparing device to obtain relevant indicators of the main examination items involving red blood cells, white blood cells, and platelets, for example, white blood cell count (WBC), red blood cell count (RBC), hemoglobin concentration (HGB), hematocrit (HCT), mean corpuscular volume (MCV), mean corpuscular hemoglobin (MCH), mean corpuscular hemoglobin concentration (MVHC), platelet count (PLT), lymphocyte ratio (LY %), monocyte ratio (MONO), neutrophil ratio (NEUT %), lymphocyte count (LY), monocyte count (MONO), neutrophil count (NEUT), red blood cell distribution width (RDW), platelet volume distribution width (PDW), mean platelet volume (MPV) and/or platelet-large cell ratio (P-LCR), etc.

Figure 24:
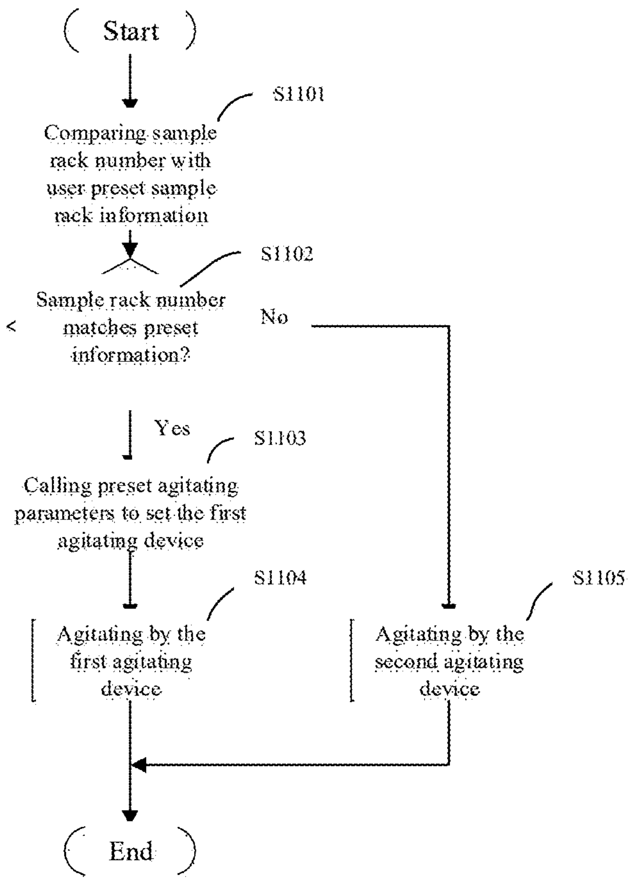
FIG. 24 is a schematic flowchart of an agitating operation in step S11 according to an embodiment of the present application.

FIG. 24 shows a schematic flow block diagram of the agitating process in step S11. As shown in FIG. 24, the controller 21 compares the code information read from the label of the sample rack 80 with user preset sample rack information (step S1101), and determines whether the read code information matches the preset sample rack information (step S1102). If the read code information matches the preset sample rack information (step S1102: Yes), it is determined that the first or third measurement mode is executed for the samples on the current sample rack, preset agitating parameters are called to set the first agitating device 11 (step S1103), and then the controller 21 controls the first agitating device 11 to agitate the blood sample in the current sample container 91 under the first or third measurement mode (step S1104). If the read code information does not match the preset sample rack information (step S1102: No), it is determined that the second measurement mode is executed for the samples on the current sample rack, and the controller 21 controls the second agitating device 12 to agitate the blood sample in the current sample container 92 (step S1105).

In step S1104 of this embodiment, after the first agitating device 11 drives the sample stirring component 112 to complete the agitating operation on the blood sample in the sample container 91, the sample stirring component 112 is cleaned and dried. Preferably, a cleaning swab can be used to clean and air-dry the sample stirring component 112 (refer to FIG. 5). In this embodiment, the cleaning and air-drying can be implemented by the swab being stationary and the sample stirring component 112 being moving, or by the sample stirring component 112 being stationary and the swab being moving.

Figure 25:
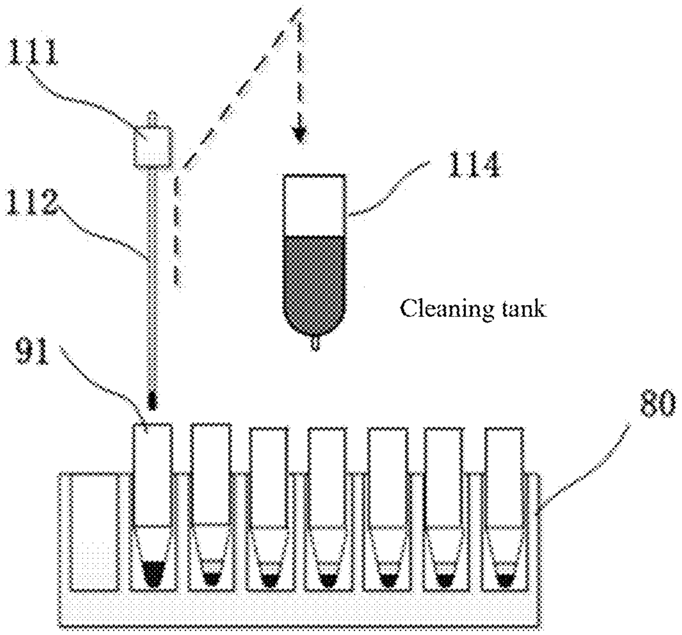
FIG. 25 is a schematic diagram of cleaning a stirring component of a first agitating device according to an embodiment of the present application.

In this embodiment, the cleaning component may further include a cleaning tank 114, and in step S1104, the cleaning can be implemented through the cleaning tank (refer to FIG. 25). That is, after the sample stirring component 112 completes stirring, it moves into the cleaning tank 114, and the sample stirring component 112 is cleaned in the cleaning tank 114 by means of fluid scouring or the like.

Figure 26:
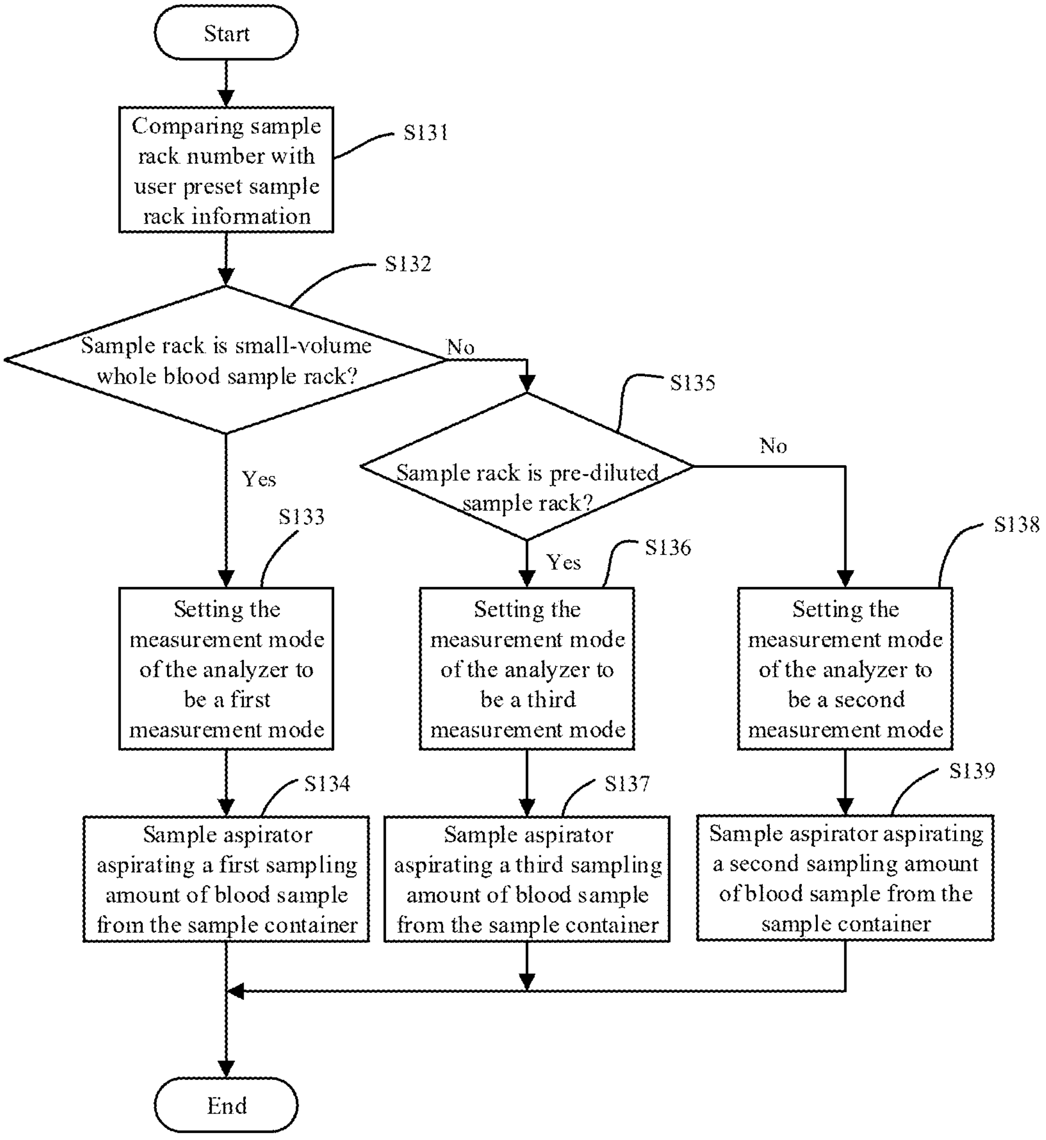
FIG. 26 is an exemplary diagram of a sample aspirating process in step S13 in a first feeding mode according to an embodiment of the present application.

FIG. 26 is an exemplary flowchart of the sample aspirating process of step S13 in the first feeding mode according to this embodiment. As shown in FIG. 26, the code information of the label of the sample rack 80 read by the container rotating code scanning device is compared with the sample rack information preset by the user (step S131). Based on the comparison result, whether the current sample rack 80 is a small-volume whole blood sample rack is determined (step S132), if it is a small-volume whole blood sample rack (step S132: Yes), the measurement mode of the device is set as the first measurement mode (step S133), and then the sample aspirator 13 aspirates a first sampling amount of blood sample from the sample container 91 on the sample rack 80 (step S134).

If it is not a small-volume whole blood sample rack (step S132: No), whether it is a pre-diluted small-volume blood sample rack is determined (step S135). If it is a pre-diluted small-volume blood sample rack (step S1635: Yes), the measurement mode of the device is set as the third measurement mode (step S136), and then the sample aspirator 13 aspirates a third sampling amount of blood sample from the sample container 91 on the sample rack 80 (step S137).

If it is not a pre-diluted small-volume blood sample rack (step S135: No), the measurement mode of the device is set as the second measurement mode (step S138), and then the sample aspirator 13 aspirates a second sampling amount of blood sample from the sample container 92 on the sample rack 80 (step S139).

Figure 27:
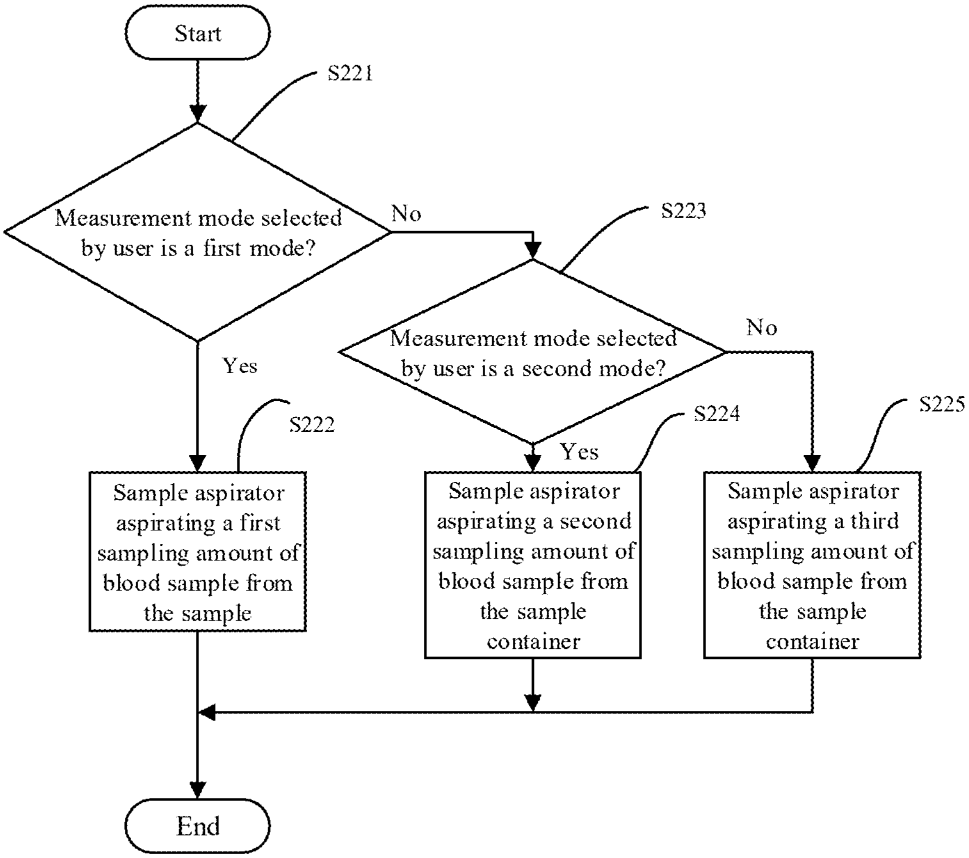
FIG. 27 is an exemplary diagram of a sample aspirating process in step S22 in a second feeding mode according to an embodiment of the present application.

FIG. 27 is an exemplary flowchart of the sample aspirating process of step S22 in the second feeding mode according to this embodiment. As shown in FIG. 27, whether the measurement mode selected by the user is the first measurement mode (step S221) is determined. If the first measurement mode is set (step S221: Yes), the sample aspirator 13 aspirates a first sampling amount of blood sample from the sample container 91 (92, 93) on the sample rack 80 (S222). If it is not the first measurement mode (step S221: No), whether it is the second measurement mode is determined (step S223). If it is the second measurement mode (step S223: Yes), the sample aspirator 13 aspirates a second sampling amount of blood sample from the sample container 94 on the sample rack 80 (step S224). If it is not the second measurement mode (step S223: No), the sample aspirator 13 aspirates a third sampling amount of blood sample from the sample container 91 (92, 93) on the sample rack 80 (step S225).

Embodiment 2

The difference between the structure of the blood analyzer in this embodiment and the blood analyzer 1 in Embodiment 1 lies in that the blood analyzer in this embodiment is not provided with the second agitating device 12, and the remaining parts are the same as the corresponding parts of the blood analyzer 1 in Embodiment 1, so the same structural parts use the same reference numerals and the descriptions thereof are omitted.

Figure 28:
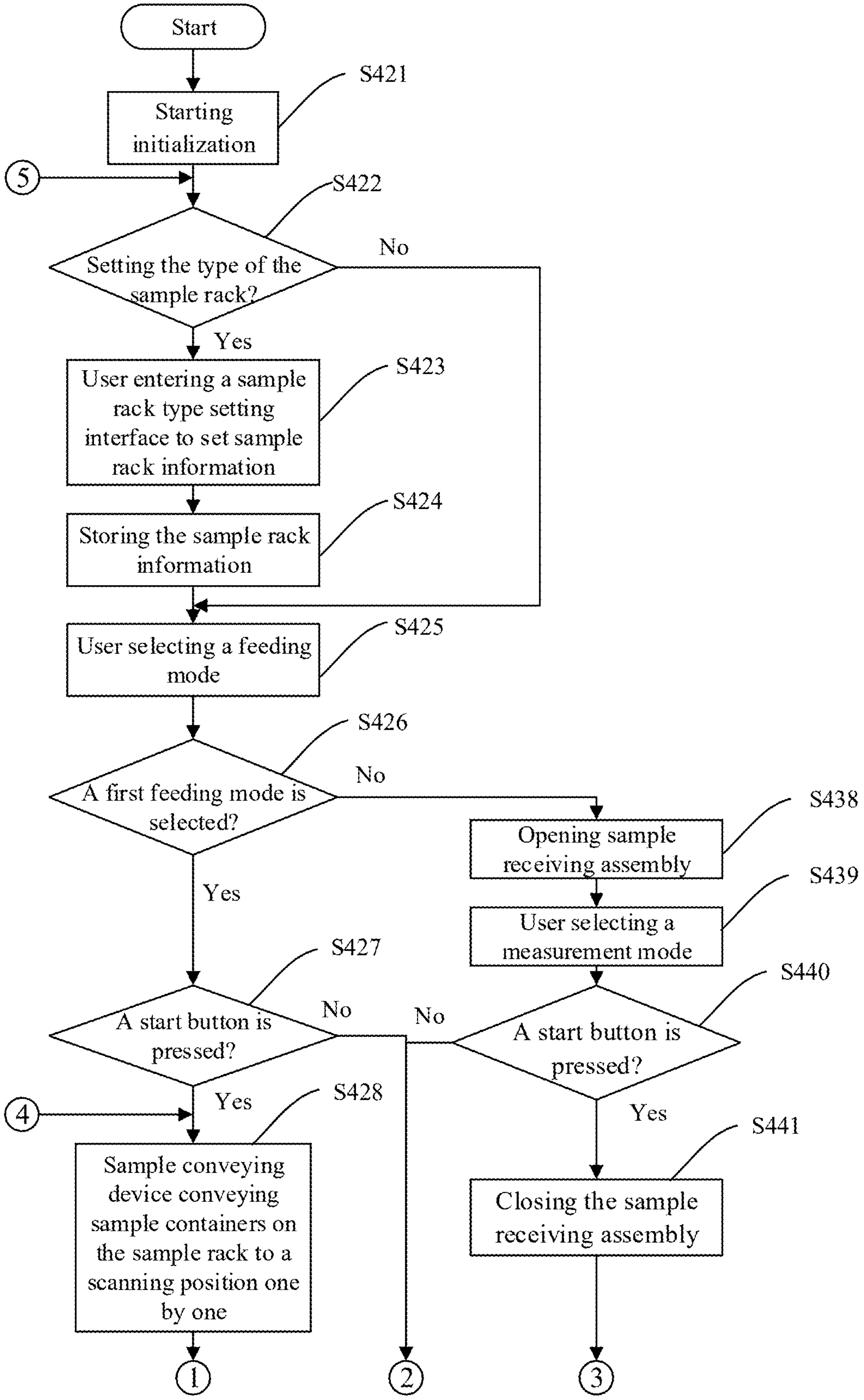
FIGS. 28 and 29 are main flowcharts of another example of analyzing and treating a blood sample by a blood sample analyzer according to the present application.
Figure 29:
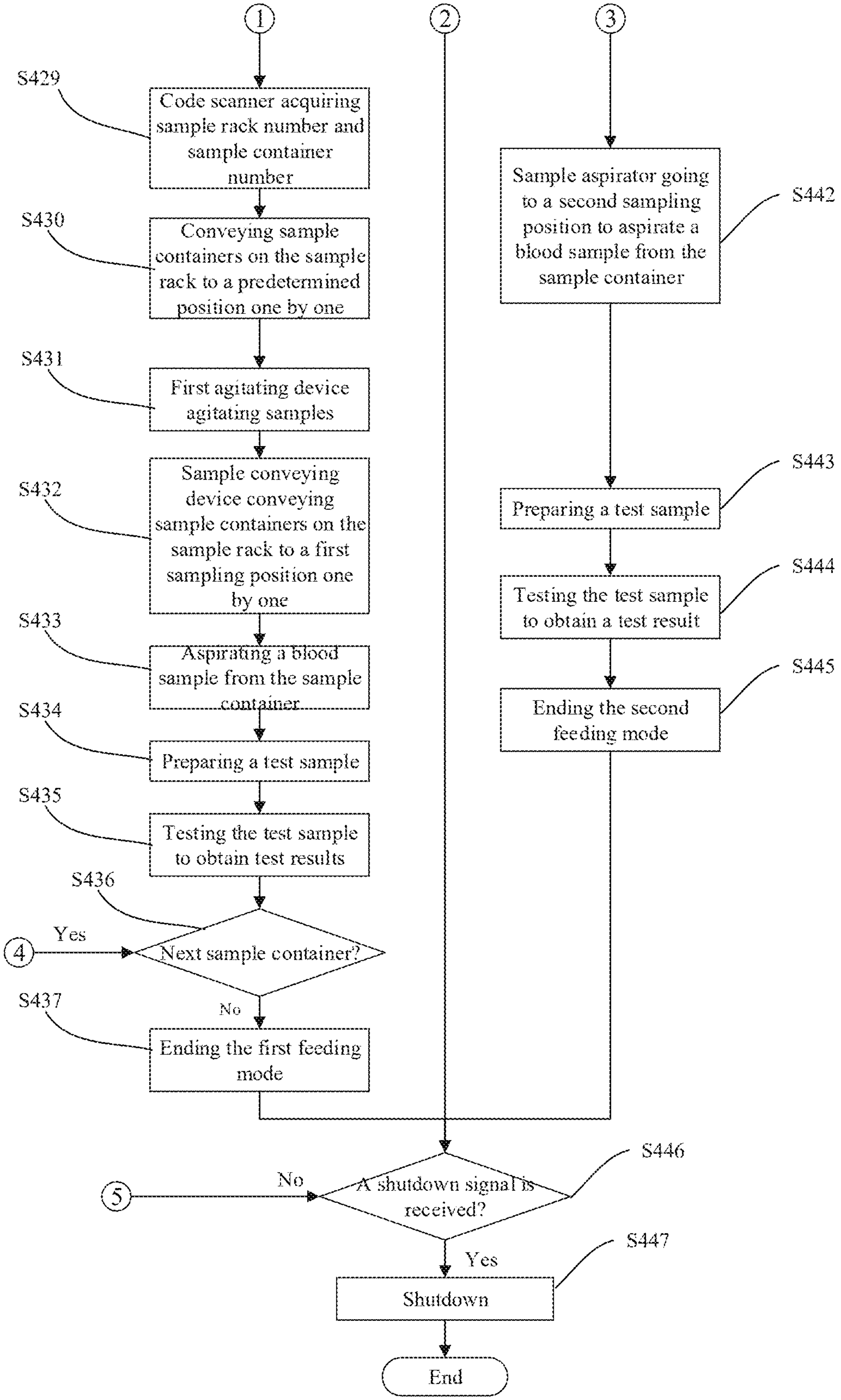

FIG. 28 and FIG. 29 show main flowcharts of an example of analyzing and treating a blood sample by the blood sample analyzer. Steps S421 to S430 and steps S432 to S447 are the same as steps S1 to S10 and steps S12 to S27 in Embodiment 1, so the descriptions thereof are omitted here.

In step S431, after the controller 21 controls the first agitating device 11 to move above the current sample container 91 used in the first measurement mode or the third measurement mode, the controller controls the sample stirring component 112 of the first agitating device 11 to move down, and drives the sample stirring component 112 to agitate the blood sample in the sample container 91.

Preferably, as shown in FIG. 23, the controller 21 controls the container pressing assembly 14 to move so that the two driven wheels 144*a* and 144*b* clamp the sample container 91 (92) on the sample rack 80, and controls the sample stirring component 112 of the first agitating device 11 to move down (Z direction) and enter the blood sample in the sample container 91 (92) for agitating.

In this embodiment, the blood analyzer is provided with only the first agitating device 11. The first agitating device 11 can be used to agitate small-volume whole blood samples, pre-diluted blood samples or venous blood samples. Before the sample conveying device 17 conveys the sample rack 80, the container cover of the sample container 92 on the sample rack 80 is opened. Preferably, the first agitating device 11 is only used to agitate small-volume whole blood samples and pre-diluted blood samples.

Embodiment 3

The difference between the structure of the blood analyzer in this embodiment and the blood analyzer in Embodiment 2 lies in that the blood analyzer in this embodiment is only provided with the second feeding mode, but is not provided with the sample conveying device 17, that is, not provided with the first feeding mode, so that the blood analyzer becomes smaller. The remaining parts are the same as the corresponding parts of the blood analyzer in Embodiment 2, so the same structural parts use the same reference numerals and the descriptions thereof are omitted.

Figure 30:
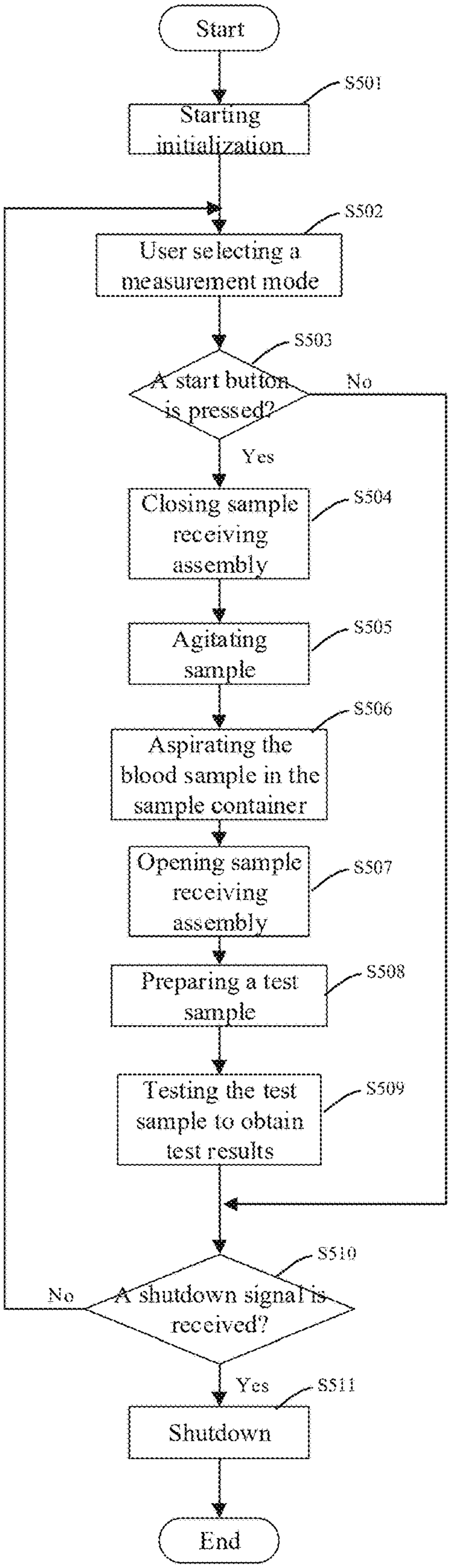
FIG. 30 is a main flowchart of still another example of analyzing and treating a blood sample by a blood sample analyzer according to the present application.

FIG. 30 is a main flowchart of an example of analyzing a blood sample by the blood sample analyzer 1. As shown in FIG. 30, the power of the blood sample analyzer 1 is first turned on, and the controller 21 starts initialization (step S501). In this initialization step, initialization of programs, initialization of fluid path components of the blood sample analyzer 1, cleaning of pipes, and resetting of driving components are performed.

Next, in step S502, the measurement mode is selected on the setting interface displayed by the display component 31. The controller 21 determines whether the start button (not shown) has been pressed (step S503). If the controller 21 determines that the start button has not been pressed (step S503: No), step S510 is performed. If it is determined that the start button has been pressed (step S503: Yes), the sample receiving cover 181 is closed, and a sample container 91 (92) is placed at a predetermined position (step S504). Regarding step S504, when the sample receiving cover 181 is originally closed, next step S505 is directly performed, and if the sample receiving cover 181 is originally opened, this step S504 is performed.

The controller 21 controls the first agitating device 11 or the second agitating device 12 to agitate the blood sample in the sample container 91 (92) (step S505). In step S505, the controller 21 determines whether the current measurement mode is the first measurement mode, the second measurement mode, or the third measurement mode. If the controller 21 determines that the current measurement mode is the first measurement mode or the third measurement mode, the controller 12 controls the first agitating device 11 to agitate the blood sample in the sample container 91 in the sample container fixing hole 182.

In step S505, if the controller 21 determines that the current measurement mode is the second measurement mode, the controller 21 controls the stepper motor 1223 of the second agitating device 12 to drive the clamping jaw 1201 to grab the sample container 92 from the sample container fixing hole 18 to a certain position and rotate the same, so as to agitate the blood sample in the current sample container 92. Those skilled in the art can understand that the second agitating device may not be provided, and only small-volume whole blood or pre-diluted blood samples are tested, thereby further miniaturizing the blood analyzer.

In step S506, the controller 21 controls, according to the measurement mode information selected by the user, the sample aspirating needle 135 of the sample aspirator 13 to aspirate a predetermined amount of blood sample from the sample container 91 (92) on the sampling position. Specifically, in the first measurement mode, the sample aspirating needle 135 of the sample aspirator 13 aspirates a first sampling amount of blood sample from the first sample container 91; in the third measurement mode, the sample aspirating needle 135 of the sample aspirator 13 aspirates a third sampling amount of blood sample from the first sample container 91; and in the second measurement mode, the sample aspirating needle 135 of the sample aspirator 13 aspirates a second sampling amount of blood sample from the second sample container 92. Preferably, the first sampling amount in the first measurement mode is less than the second sampling amount in the second mode, for example, the first sampling amount is preferably 5-50 μL, more preferably 15-35 μL.

After the blood sample is aspirated, the sample receiving cover 181 is opened to take out the aspirated sample container 91 (92) (step S507). In the present application, the step of opening the sample receiving cover 181 to take out the aspirated sample container 91 (92) may also be performed any time after the blood sample is aspirated, and is not limited to immediately taking out after the blood sample is aspirated.

In step S508, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount. Preferably, the first sampling amount is less than the second sampling amount, for example, the first sampling amount is 5-50 μL, more preferably 15-35 μL.

In step S509, the tester of the blood sample analyzer 1 tests the test sample prepared by the sample preparing device to obtain test results, and then step S510 is performed.

In step S510, if a shutdown instruction is not received (step S510: No), the process returns to step S502; and if a shutdown instruction is received (step S510: Yes), shutdown is performed (step S511), and then the process ends.

In this embodiment, the sample in the sample container 91 that is agitated by the first agitating device 11 may be a whole blood sample or a pre-diluted sample. The whole blood sample may be a peripheral whole blood sample or a venous whole blood sample.

In this embodiment, preferably, the first agitating device 11 is configured to only agitate small-volume whole blood samples or pre-diluted blood samples.

Blood is composed of blood cells and blood plasma. Since the specific gravity of the blood cells is greater than that of the blood plasma, blood will be stratified after being stood for a period of time, wherein the blood cells are settled and the plasma are located above the blood cells. The hemoglobin concentration (HGB) is an important parameter for blood sample measurement, and it refers to the amount of hemoglobin contained in a unit volume of blood. Hemoglobin, also known as blood pigment, is only found in red blood cells and is the main component of red blood cells.

When a blood sample is not agitated thoroughly, red blood cell concentration at the lower part of the blood sample is higher than that at the upper part. When the sampling needle aspirates the sample close to the bottom of the blood collection tube (in order to reduce the requirement of the blood analyzer on the blood collection amount, the sampling needle usually aspirates the sample close to the bottom of the blood collection tube), the hemoglobin concentration (HGB) measured by the blood analyzer is significantly higher than the actual value, and the fluctuation range of the hemoglobin concentrations (HGB) measured multiple times is relatively large. Therefore, the stability of hemoglobin concentration (HGB) measurement is often used to evaluate the effect of blood sample agitating.

In the various above embodiments, not only the problem of blood sample loss and peripheral blood agitating caused by the fact that the blood adheres to the cap or wall of the blood collection tube is avoided, but also the blood sample can be agitated thoroughly. When the blood sample is agitated thoroughly, its hemoglobin concentration (HGB) is very stable, and the fluctuation range of repeated measurements generally does not exceed±2 g/L.

In the embodiments above, the sample stirring component 112 of the first agitating device 11 is driven by the agitating device driving motor to enter the sample container for stirring. The present application is not limited to this. The sample conveying device 17 can further convey a sample rack 80 loaded with a sample container to a predetermined position, and the clamping jaw 1201 of the second agitating device 12 grabs and moves the sample rack 80 or the sample container on the sample rack 80 to a agitating position, so that the sample stirring component 112 enters the sample container relatively without moving the first agitating device 11; and the sample stirring component 112 is driven to stir the blood sample in the sample container. In this way, the blood sample in the sample container is stirred, so that the moving device of the first agitating device 11 can be omitted.

In the embodiment above, the sample stirring component 112 may also be installed on an up-and-down moving mechanism, and the stirring rod may be controlled to move up and down by drive of a motor and transmission of a belt pulley or a screw rod. At the same time, the sample stirring component 112 is installed on the up-and-down moving mechanism by means of bearing connection, so that the sample stirring component 112 can rotate along its axis while moving up and down. The above-mentioned sample container 91 (92) is placed on the sample rack 80 and horizontally moved to a predetermined position (agitating position) by the sample conveying device 17. After the sample container 91 (92) arrives, the sample stirring component 112 moves down (in Z direction of FIG. 23), reaches into the sample container 91 (92) and arrives at the bottom of the sample container 91 (92). After the sample stirring component 112 is in place, the sample stirring component 112 drives the sample in the sample container 91 (92) to rotate by means of rotation along its axis, to achieve the effect of sample agitating. After the agitating is completed, the sample stirring component 112 is moved upwards, and the cleaning component 113 cleans the small amount of sample adhered to the outer wall of the sample stirring component 112. After the sample stirring component 112 leaves the sample container 91 (92), the sample conveying device 17 pushes the sample container 91 (92) to move so that the sample container 91 (92) arrives at the sampling position, and the analyzer starts to collect and analyze the blood.

The present application can be used to measure hemoglobin concentration (HGB). The hemoglobin concentration (HGB) is an important parameter for blood sample measurement, and it refers to the amount of hemoglobin contained in a unit volume of blood. Hemoglobin, also known as blood pigment, is only found in red blood cells and is the main component of red blood cells. Blood is composed of blood cells and blood plasma. Since the specific gravity of the blood cells is greater than that of the blood plasma, blood will be stratified after being stood for a period of time, wherein the blood cells are settled and the plasma are located above the blood cells.

When a blood sample is not agitated thoroughly, red blood cell concentration at the lower part of the blood sample is higher than that at the upper part. When the sampling needle aspirates the sample close to the bottom of the blood collection tube (in order to reduce the requirement of the blood analyzer on the blood collection amount, the sampling needle usually aspirates the sample close to the bottom of the blood collection tube), the hemoglobin concentration (HGB) measured by the blood analyzer is significantly higher than the actual value, and the fluctuation range of the hemoglobin concentrations (HGB) measured multiple times is relatively large. Therefore, the stability of hemoglobin concentration (HGB) measurement is often used to evaluate the effect of blood sample agitating.

In the present application, the sample preparing device prepares a test sample for a hemoglobin concentration (HGB) test item from a blood sample of a subject, and the tester obtains a relevant indicator of the hemoglobin concentration (HGB).

In the various above embodiments, not only the problem of blood sample loss and peripheral blood agitating caused by the fact that the blood adheres to the cap or wall of the blood collection tube is avoided, but also the blood sample can be agitated thoroughly. When the blood sample is agitated thoroughly, its hemoglobin concentration (HGB) is very stable, and the fluctuation range of repeated measurements generally does not exceed+2 g/L.

FIG. 31 is an analysis data diagram of 6 small-volume whole blood samples, each small-volume whole blood sample has a volume of 100 μL. The blood samples were agitated by the agitating device 11, and were respectively tested for 6 times in the first measurement mode of Embodiment 1. According to the data in FIG. 31, the fluctuation range of hemoglobin concentrations (HGB) is only 1 g/L, which is very stable.

FIG. 32 shows HGB data of 6 first sample containers 91 containing different small-volume whole blood samples respectively having a volume of 30 μL, 50 μL, 100 μL, 150 μL, 200 μL and 250 μL, wherein the blood samples in the 6 first sample containers were respectively tested for 6 times in the first measurement mode. According to the data, the fluctuation range of hemoglobin concentrations (HGB) does not exceed±2 g/L, which meets the measurement requirements.

In Embodiment 1 above, the second agitating device 12 can grab the sample container on the sample rack 80 and drive the sample container containing common-volume blood for inverted agitating. However, the present application is not limited to this. The second agitating device 12 can also grab the sample rack 80 and drive all the sample containers containing common-volume blood on the sample rack 80 for inverted agitating.

In the present application, the agitating position refers to a position where the first agitating device 11 or the second agitating device 12 agitates the blood sample in the sample container. For example, when the first agitating device 11 agitates the blood sample in the sample container on the predetermined position, the agitating position and the predetermined position are the same position.

Embodiment 4

Figure 33:
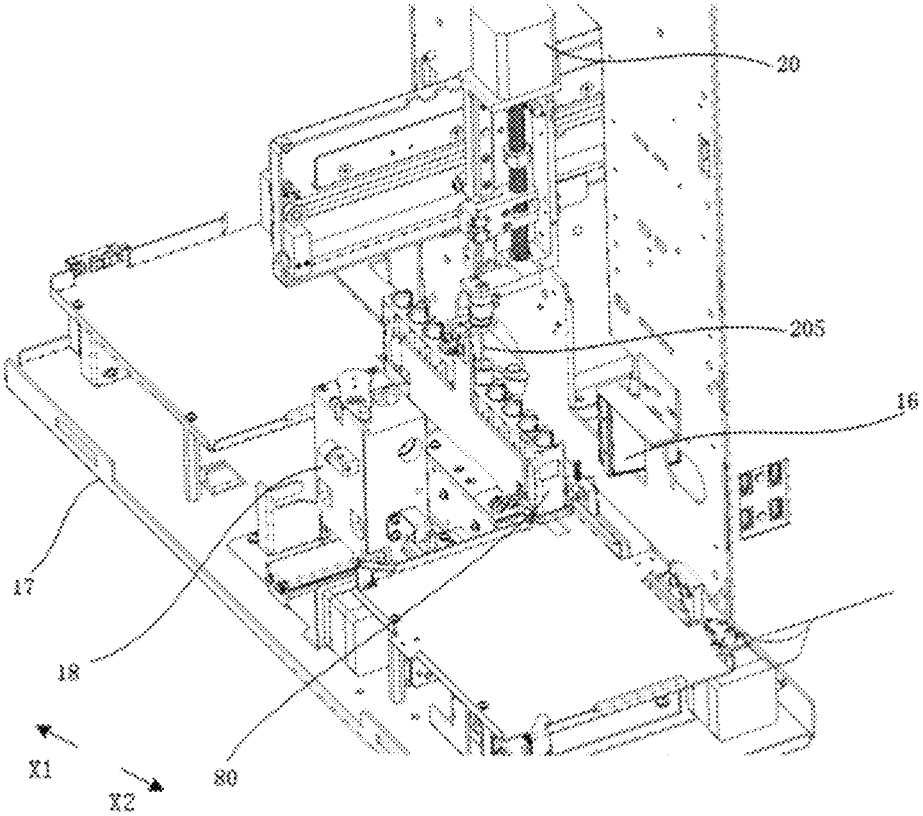
FIG. 33 is a schematic structural diagram of an agitating device according to an embodiment of the present application.

FIG. 33 is a schematic structural diagram of an agitating device in this embodiment. As shown in FIG. 33, the sample conveying device 17 or the sample receiving assembly 18 conveys the sample container 91 (92) to a sampling position. The so-called sampling position refers to a position for sampling by the sampling needle 205 (135). The sample aspirator 13 moves the sample aspirating needle 205 into the sample container 91 (92), and drives the sample aspirating needle 205 to suction an appropriate amount of blood sample, and then to discharge the suctioned blood sample to the sample container 91 (92), so that the blood sample in the sample container 91 (92) forms a certain flow, and the blood sample is agitated uniformly.

Figure 34:
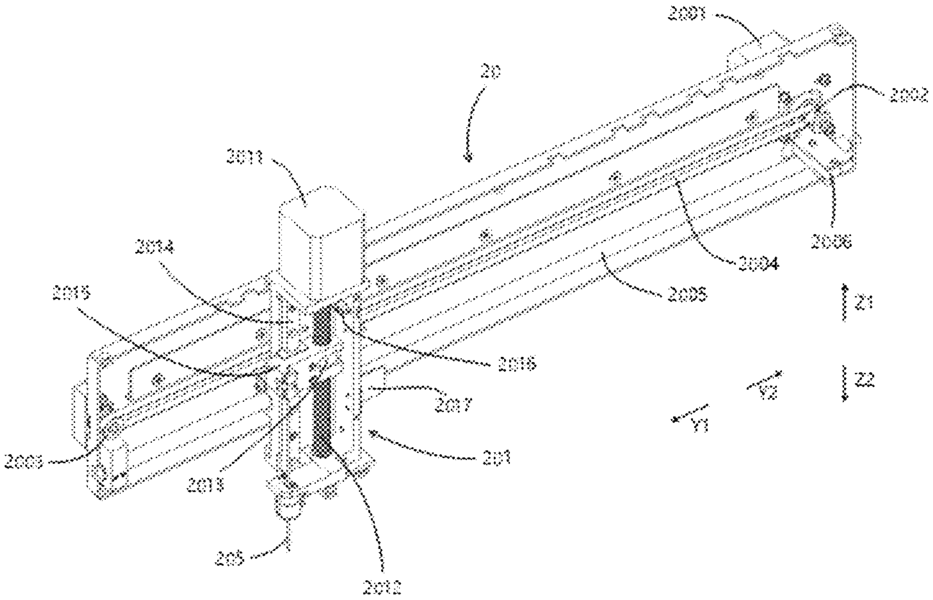
FIG. 34 is a schematic structural diagram of another sample aspirator according to an embodiment of the present application.

FIG. 34 is a schematic structural diagram of a sample aspirator in this embodiment. As shown in FIG. 34, the sample aspirator 20 is configured to uniformly mix the blood sample in the sample container 91 (92) conveyed by the sample conveying device 17 to the sampling position of the analyzer 1 and aspirate an appropriate amount of blood sample from the agitated blood sample for sample preparation.

The sample aspirator 20 includes: a sample aspirating needle 205, a moving assembly 201 for the sample aspirating needle, a stepper motor 2001, synchronous wheels 2002 and 2003, a ring-shaped synchronous toothed belt 2004 wound on the synchronous wheels 2002 and 2003, a linear guide rod 2005 placed in Y1 and Y2 directions, a position sensor 2006, a suction and discharge driving device (not shown), a air-drying device for the sample aspirating needle (not shown), etc. The suction and discharge driving device is configured to drive the sample aspirating needle 205 to suction an appropriate amount of blood sample, and then to discharge the suctioned blood sample to the sample container 91 (92), so that the blood sample in the sample container 91 (92) forms a certain flow, and the blood sample is agitated uniformly. Preferably, the suction and discharge driving device is a syringe.

The moving assembly 201 for sample aspirating needle is connected with the ring-shaped synchronous toothed belt 2004 by a connector. The ring-shaped synchronous toothed belt 2004 is driven by the rotation of the stepper motor 2001 and rotates under the guidance of the two synchronous wheels 2002 and 2003. The moving assembly 201 for sample aspirating needle can drive the sample aspirating needle 205 to move in the Y1 or Y2 direction under the drive of the stepper motor 2001. The initial position of the moving assembly 201 for sample aspirating needle in the Y1 or Y2 direction is positioned by the position sensor 2006 and a sensor chip 2018 fixed on the moving assembly 201 for sample aspirating needle.

The moving assembly 201 for sample aspirating needle includes: a stepper motor 2011, a screw rod 2012, a nut 2023, a linear slide rail 2014, a fixing component 2015 for the sample aspirating needle, a position sensor 2016, a sensor chip 2017, a position sensor (not shown) for sample aspirating needle, etc. The position sensor for sample aspirating needle is configured to sense the down position of the sample aspirating needle 205 to prevent the tip of the sample aspirating needle 205 from continuing to descend after arriving at the bottom of the sample container 91 (92), which may result in damage of the tip of the sample aspirating needle 205 or the sample container 91 (92).

The sample aspirating needle 205 is fixed on the fixing component 2015 for sample aspirating needle, the fixing component 2015 for sample aspirating needle is fixed on the linear slide rail 2014 placed in Z1 or Z2 direction by screws, the nut 2013 is stuck in a slot of the fixing component 2015 for sample aspirating needle, and the nut 2013 and the fixing component 2015 for sample aspirating needle do not rotate relatively. The screw rod 2012 is connected with a rotating shaft of the stepper motor 2011 by screws. The stepper motor 2011 can drive the screw rod 2012 to rotate, and drive the fixing component 2015 for sample aspirating needle to drive the sample aspirating needle 205 to move in Z1 or Z2 direction. The initial position of the sample aspirating needle 205 in Z1 or Z2 direction is positioned by the position sensor 2017 and an optical coupling sensor chip (not shown)

arranged on the fixing component 2015 for sample aspirating needle, and the dynamic positioning of the sample aspirating needle 205 in Z1 or Z2 direction is implemented by the position sensor for sample aspirating needle, to prevent the tip of the sample aspirating needle 205 from continuing to descend after arriving at the bottom of the sample container 91 (92).

Under the drive of the stepper motor 2001 and the stepper motor 2011, the sample aspirating needle 205 can move in two dimensions in Y1 or Y2 direction and Z1 or Z2 direction. The functions of agitating the blood sample in the sample container through the suction and discharging operation, aspirating an appropriate amount of blood sample from the agitated blood sample, and dispensing the blood sample to the sample preparation device can be realized.

In this embodiment, the steps of suctioning and discharging the blood sample in the sample container 91 (92) through the sample aspirating needle 205 for agitating are as follows:

the controller 21 determines whether the feeding mode is the first feeding mode or the second feeding mode;

if the feeding mode is the first feeding mode, the sample conveying device 17 conveys the sample container 91 (92) on the sample rack 80 to a first sampling position; if the feeding mode is the second feeding mode, the sample receiving assembly 18 conveys a single sample container 91 (92) to a second sampling position, wherein the first sampling position and the second sampling position may be the same position or different positions;

the outer wall of the sample aspirating needle 205 is air-dried by the air-drying device for sample aspirating needle, and the suction and discharge driving device drives the sample aspirating needle 205 to suction an appropriate amount of air, so that an isolated air column is formed inside the sample aspirating needle 205;

the moving assembly 201 for sample aspirating needle drives the sample aspirating needle 205 to move down, the position sensor for sample aspirating needle or the sample aspirating needle driving device determines, according to the number of steps of the motor, whether the tip of the sample aspirating needle 205 arrives at the bottom of the sample container 91 (92), and if the tip of the sample aspirating needle 205 arrives at the bottom of the sample container 91 (92), the moving assembly 201 for sample aspirating needle stops driving the sample aspirating needle 205 to move down, or else continues to drive the sample aspirating needle 205 to move down till arriving at the bottom of the sample container 91 (92);

the suction and discharge driving device drives the sample aspirating needle 205 to suction an appropriate amount of blood sample, and then to discharge the suctioned blood sample to the sample container 91 (92), so that the blood sample in the sample container 91 (92) forms a certain flow, till the blood sample is agitated uniformly;

the sample aspirating needle 205 suctions an appropriate amount of the agitated blood sample from the sample container 91 (92) for blood sample collection.

In this embodiment, the sample container 91 (92) contains a whole blood sample, and since the whole blood sample is directly suctioned and discharged by the sample aspirating needle 205 and is thus agitated, the sample aspirating needle 205 can directly suction a predetermined volume of the whole blood sample after agitating, without cleaning the sampling needle.

It could be appreciated by those skilled in the art that the steps, measures or schemes of the various operations, methods or processes discussed in the present application may be alternated, changed, combined or deleted. Further, other steps, measures or schemes having those in the various operations, methods or processes discussed in the present application may also be alternated, changed, rearranged, decomposed, combined or deleted. Further, steps, measures or schemes of the prior art having those of the various operations, methods or processes disclosed in the present application can also be alternated, changed, rearranged, decomposed, combined or deleted.

Described above are merely some embodiments of the present application. It should be appreciated that many improvements and modifications may also be made for those of ordinary skill in the art without departing from the principle of the present application, and these improvements and modifications shall fall into the protection scope of the present application.

What is claimed is:

1. A blood sample analyzer, comprising:

a sample rack, configured to hold a first sample container loaded with a first sample amount of whole blood sample and/or hold a second sample container loaded with a second sample amount of whole blood sample, wherein the first sample amount is smaller than the second sample amount;

a sample conveying device for conveying the sample rack loaded with the first sample container and/or the second sample container;

a first agitating device having a sample stirring component for stirring the whole blood sample in the first sample container, the first agitating device being capable of driving the sample stirring component to perform a stirring agitating operation on the whole blood sample contained in the first sample container when the first sample container is positioned at a first agitating position, wherein the first sample container has a cover that is open;

a second agitating device capable of picking up the sample rack or the second sample container on the sample rack, and performing an inverted agitating operation on the whole blood sample contained in the second sample container when the second sample container is positioned at a second agitating position and is sealed with a cover, wherein the first agitating device and the second agitating device are accommodated in a same housing;

a sample aspirator, configured to aspirate a predetermined amount of blood sample from the first sample container or the second sample container that is conveyed to a first sampling position and has been subject to the stirring agitating operation or the inverted agitating operation;

a sample preparing device, configured to prepare a test sample from the blood sample aspirated by the sample aspirator;

a tester, configured to test the test sample prepared by the sample preparing device, so as to obtain a test result; and a controller, configured to communicate with the sample conveying device, the first agitating device and the second agitating device, and to control the sample conveying device, the first agitating device and the second agitating device;

wherein the controller is configured to:

determine whether a first measurement mode or a second measurement mode is set;

when the first measurement mode is determined to be set, control the first agitating device to perform the stirring agitating operation on the whole blood sample in the first sample container; and when the second measurement mode is determined to be set, control the second agitating device to perform the inverted agitating operation on the whole blood sample in the second sample container.

2. The blood sample analyzer according to claim 1, wherein the sample stirring component comprises a cylindrical, paddle-shaped or polygonal head.

3. The blood sample analyzer according to claim 1, wherein the controller controls the sample stirring component to perform stirring in one or any combination of rotation, circular orbit, linear swing, and up-and-down vibration modes.

4. The blood sample analyzer according to claim 1, wherein the sample stirring component is capable of moving up and down, and is capable of moving downwards into the first sample container at the first agitating position for agitation.

5. The blood sample analyzer according to claim 1, further comprising:

a cleaning component for cleaning the sample stirring component; wherein the cleaning component comprises a cleaning fluid inlet and a cleaning fluid outlet; the cleaning fluid outlet is configured for exhausting air to dry the sample stirring component.

6. The blood sample analyzer according to claim 1, further comprising:

a cleaning component, the cleaning component comprising a cleaning tank in which the sample stirring component is cleaned.

7. The blood sample analyzer according to claim 1, further comprising:

a measurement mode setting device for setting a first measurement mode and a second measurement mode;

wherein the controller determines whether the first measurement mode or the second measurement mode is set according to the setting of the measurement mode setting device.

8. The blood sample analyzer according to claim 7, wherein: the blood sample in the first sample container is pre-diluted;

the measurement mode setting device is further configured to set a third measurement mode; and when the third measurement mode is determined to be set, the controller controls the first agitating device to agitate the pre-diluted blood sample in the first sample container.

9. The blood sample analyzer according to claim 1, wherein the controller is further configured to:

when the first measurement mode is determined to be set, control a sample aspirating needle of the sample aspirator to aspirate a first sampling amount of the whole blood sample from the first sample container; and when the second measurement mode is determined to be set, control the sample aspirating needle to aspirate a second sampling amount of the whole blood sample from the second sample container;

wherein the first sampling amount is less than the second sampling amount; the first sampling amount is 5-50 μL or 15-35 μL.

10. The blood sample analyzer according to claim 1, wherein the whole blood sample in the first sample container has a volume of 30-250 μL; or 50-200 μL; or 50-100 μL.

11. The blood sample analyzer according to claim 1, wherein the blood sample contained in the first sample container is agitated while being clamped.

12. The blood sample analyzer according to claim 1, wherein the sample rack is configured to hold either the first sample container or the second sample container, wherein the controller is further configured to determine, according to a code information of a label of the sample rack, whether the first measurement mode or the second measurement mode is set.

13. The blood sample analyzer according to claim 1, further comprising:

a sample receiving assembly having a sample container fixing hole, and configured for individually conveying a first sample container or a second sample container placed in the sample container fixing hole, wherein the controller is further configured to:

determine whether a current feeding mode selected by a user is a first feeding mode or a second feeding mode, when the current feeding mode is determined to be the first feeding mode, control the sample conveying device to convey the sample rack loaded with the first sample container and/or the second sample container to a predetermined position, and to convey the first sample container or the second sample container containing an agitated blood sample to first sampling position; and control a sample aspirating needle of the sample aspirator to aspirate an amount of blood sample from the first sample container or second sample container at the first sampling position; and when the current feeding mode is determined to be the second feeding mode, control the sample receiving assembly to convey the first sample container or the second sample container containing an agitated blood sample placed in the sample container fixing hole individually to a second sampling position; and control the sample aspirating needle to aspirate an amount of blood sample from the first sample container or second sample container at the second sampling position.

* * * * *